United States Patent
Fujita et al.

(10) Patent No.: US 8,104,832 B2
(45) Date of Patent: Jan. 31, 2012

(54) SEAT INCLUDING A TORSION BAR

(75) Inventors: Etsunori Fujita, Hiroshima (JP); Hiroki Oshimo, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 162 days.

(21) Appl. No.: 12/526,972

(22) PCT Filed: Oct. 25, 2007

(86) PCT No.: PCT/JP2007/070787
§ 371 (c)(1),
(2), (4) Date: Nov. 16, 2009

(87) PCT Pub. No.: WO2008/099538
PCT Pub. Date: Aug. 21, 2008

(65) Prior Publication Data
US 2010/0090514 A1  Apr. 15, 2010

(30) Foreign Application Priority Data
Feb. 14, 2007 (JP) ................................ 2007-034145

(51) Int. Cl.
*A47C 31/00* (2006.01)
(52) U.S. Cl. ................. 297/217.2; 297/217.3
(58) Field of Classification Search ............. 297/344.15, 297/338, 344.13, 217.2, 217.3, 452.41, 284.6; 248/560
See application file for complete search history.

(56) References Cited

U.S. PATENT DOCUMENTS

| 4,767,157 A * | 8/1988 | Kazaoka et al. ............... 297/322 |
| 4,993,678 A * | 2/1991 | Easter ........................... 248/371 |
| 2007/0078351 A1 | 4/2007 | Fujita et al. |
| 2007/0299636 A1 | 12/2007 | Fujita et al. |

FOREIGN PATENT DOCUMENTS

| JP | 59 104833 | 7/1984 |
| JP | 63 105528 | 7/1988 |
| JP | 4 93638 | 8/1992 |
| JP | 2001 18698 | 1/2001 |
| JP | 2002 87131 | 3/2002 |
| JP | 2004 28714 | 1/2004 |
| WO | 2005 039415 | 5/2005 |
| WO | 2005 092193 | 10/2005 |

* cited by examiner

*Primary Examiner* — Milton Nelson, Jr.
(74) *Attorney, Agent, or Firm* — Oblon, Spivak, McClelland, Maier & Neustadt, L.L.P.

(57) ABSTRACT

A seat in which a cushioning member has a high following ability to a human body motion and which can efficiently damp a vibration inputted from the outside is provided. The seat is constituted to use a torsion bar 112 and to support a cushioning member of a seat cushion section 150 by a parallel link mechanism having a first link plate 113 pivotally supported by the torsion bar 112, a second link plate 116 disposed in correspondence with the first link plate 113, and a connection link plate 117 connecting the first link plate 113 and the second link plate 116, and operational directions of the first link plate 113 and the second link plate 116 are set to almost coincide with a vertical direction along a surface of a seat back section. Thus, a rotational motion following a human body motion generated by an external vibration input is performed, so that a relative motion between a human body and the cushioning member is small and a resonance peak is lowered, whereby a vibration absorption characteristic can be improved.

15 Claims, 19 Drawing Sheets

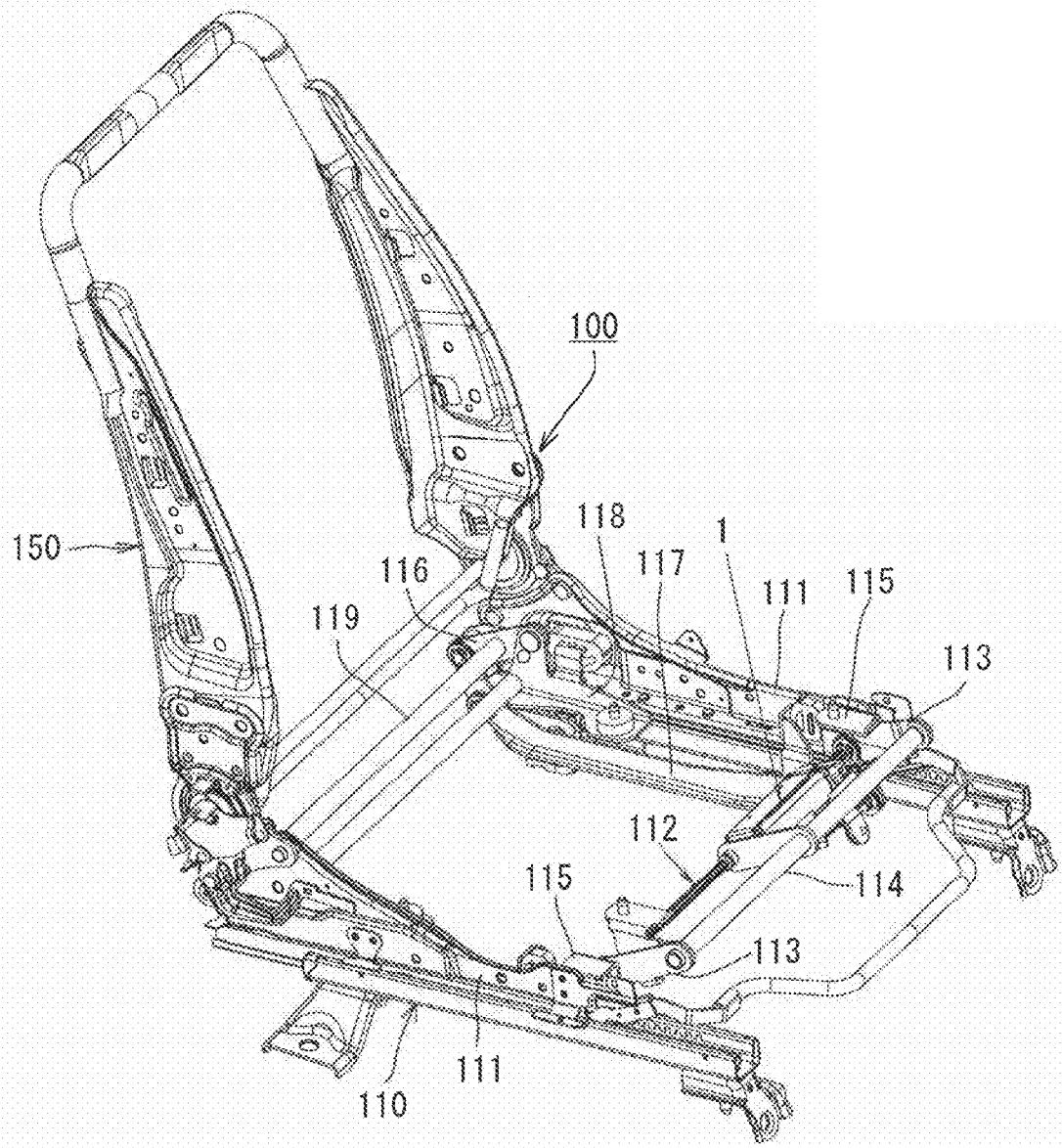
F I G. 1

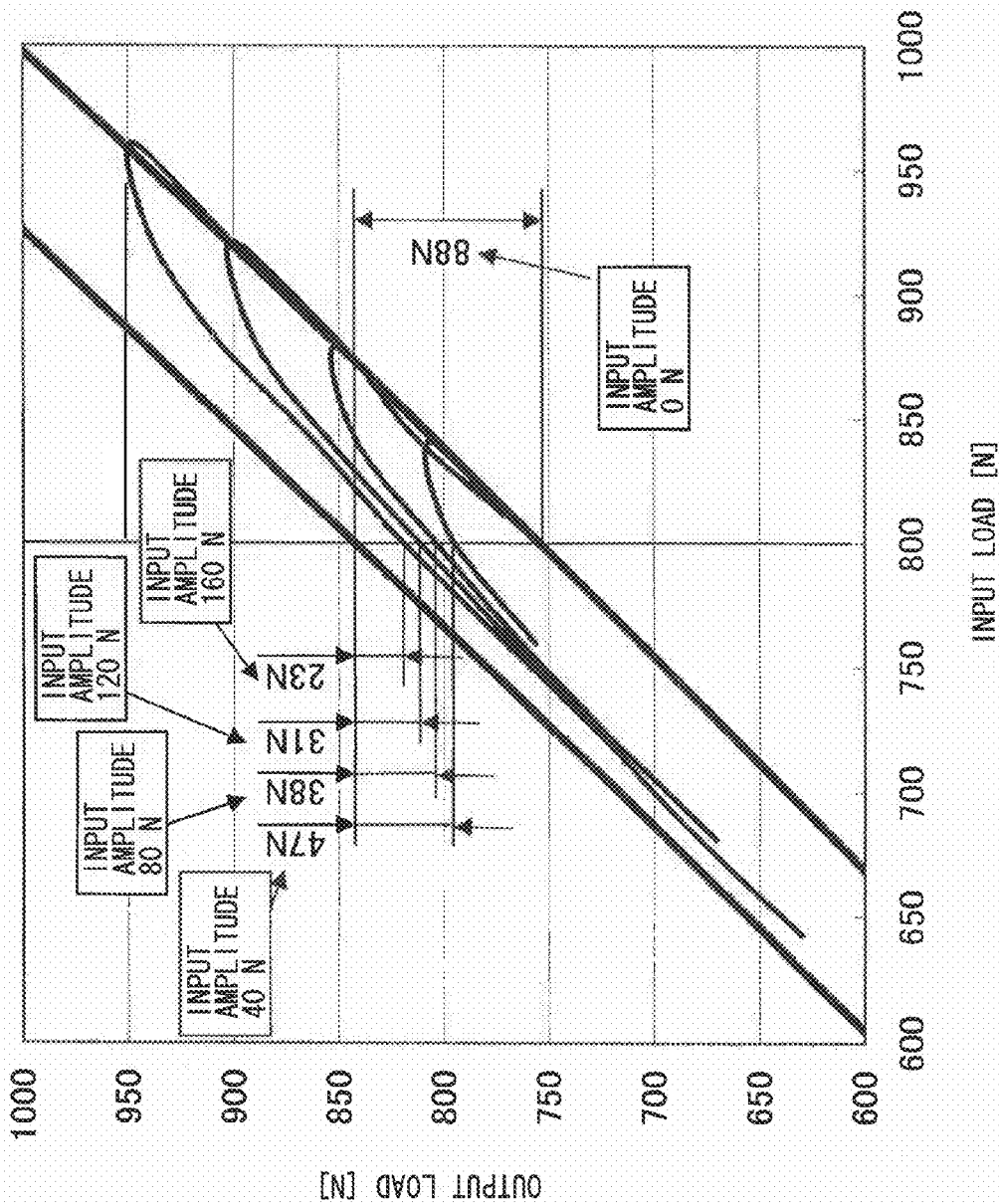

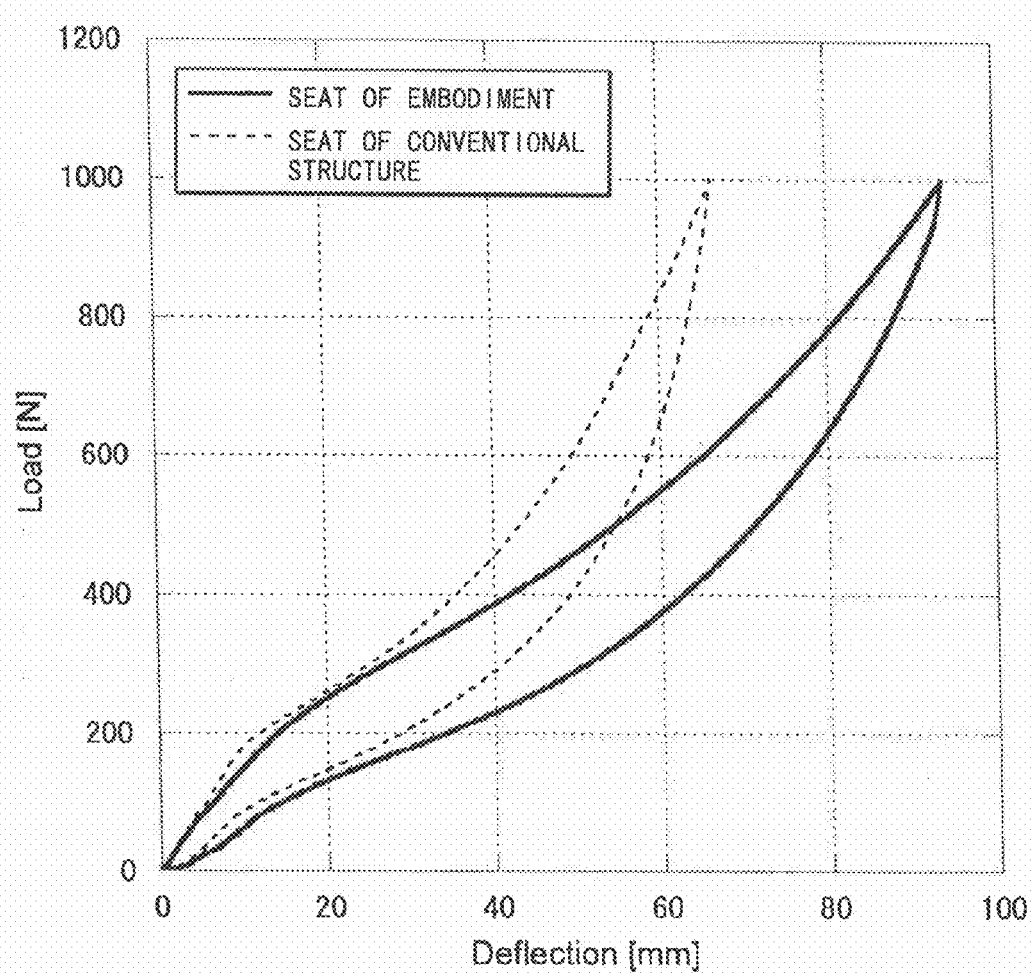

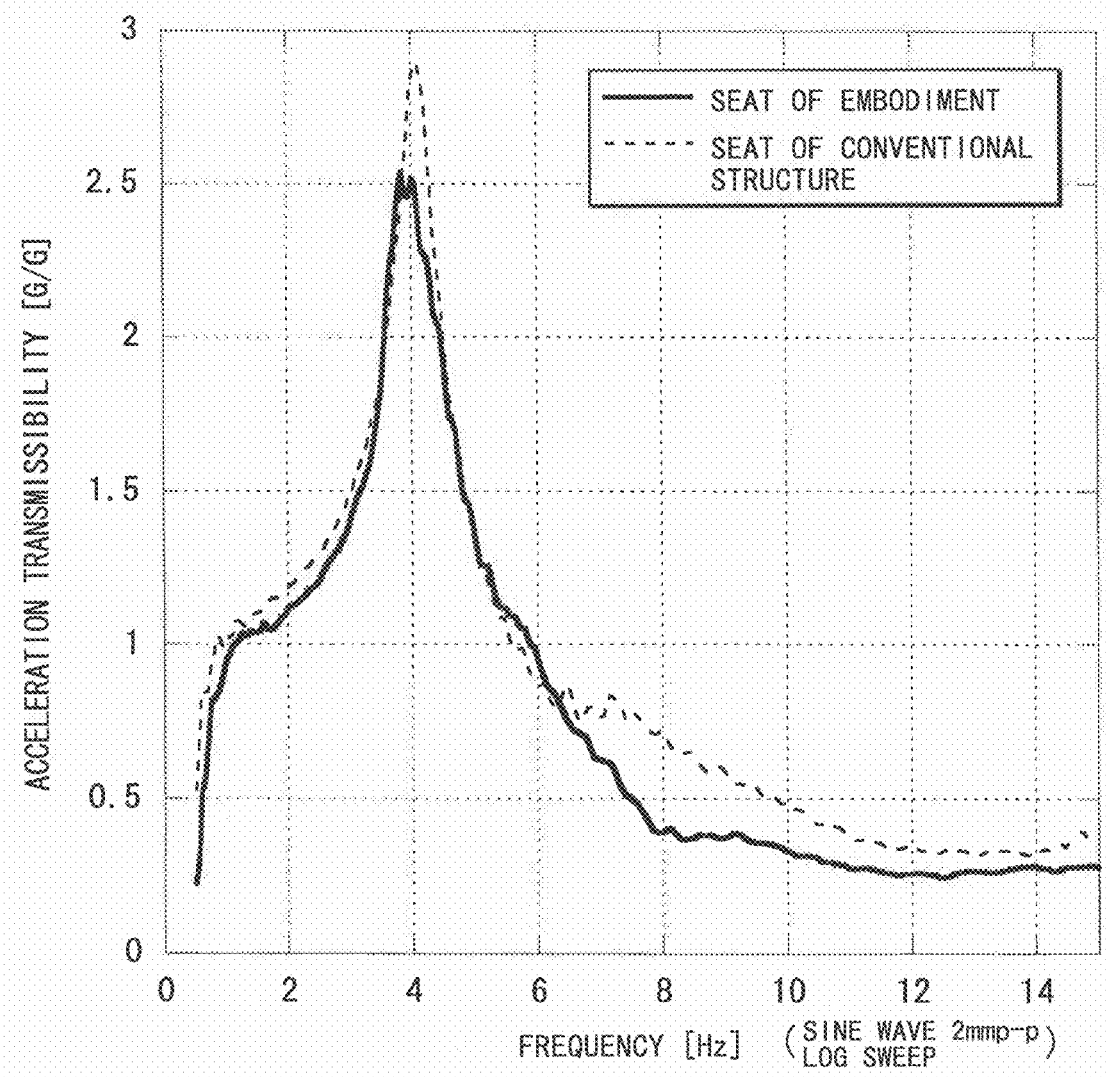

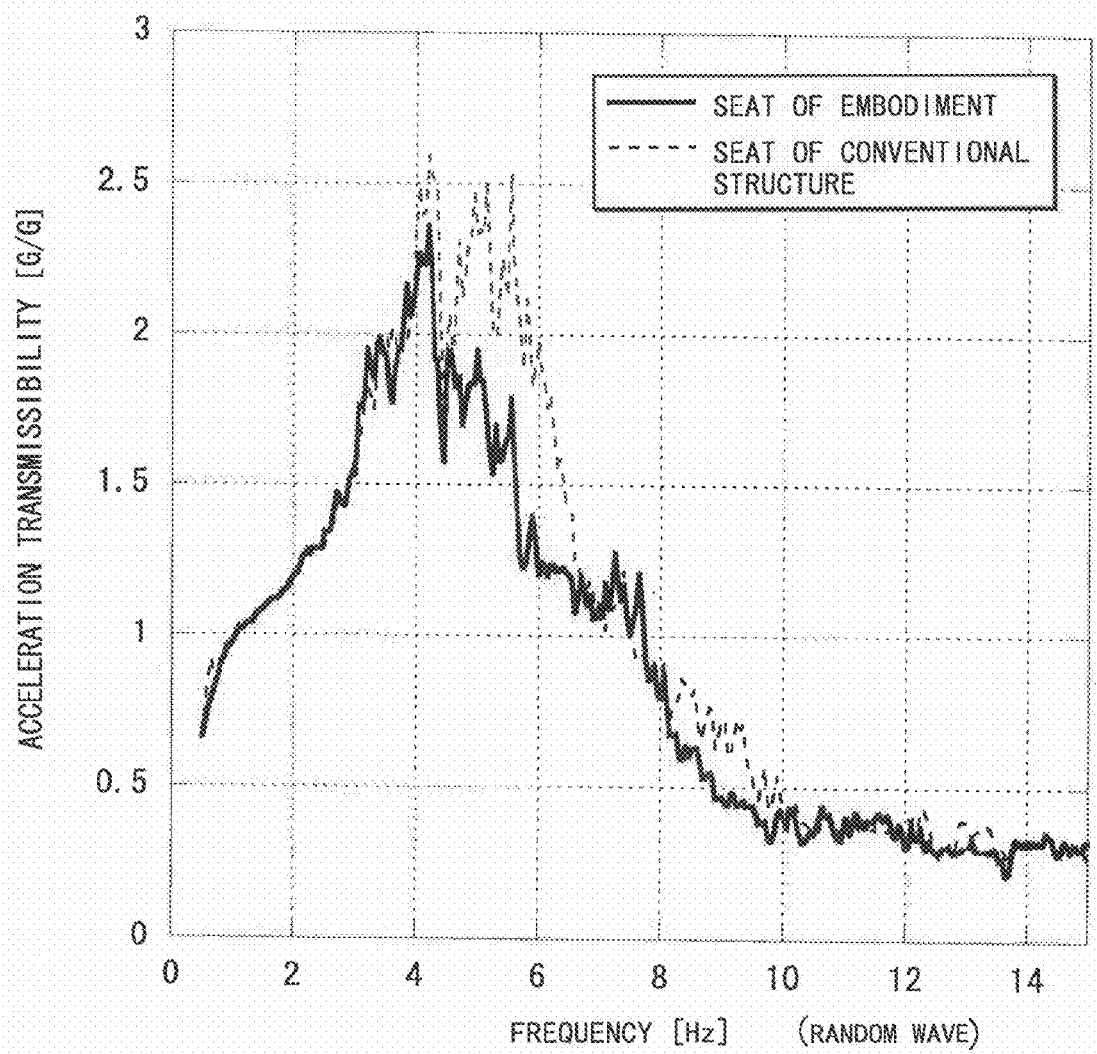

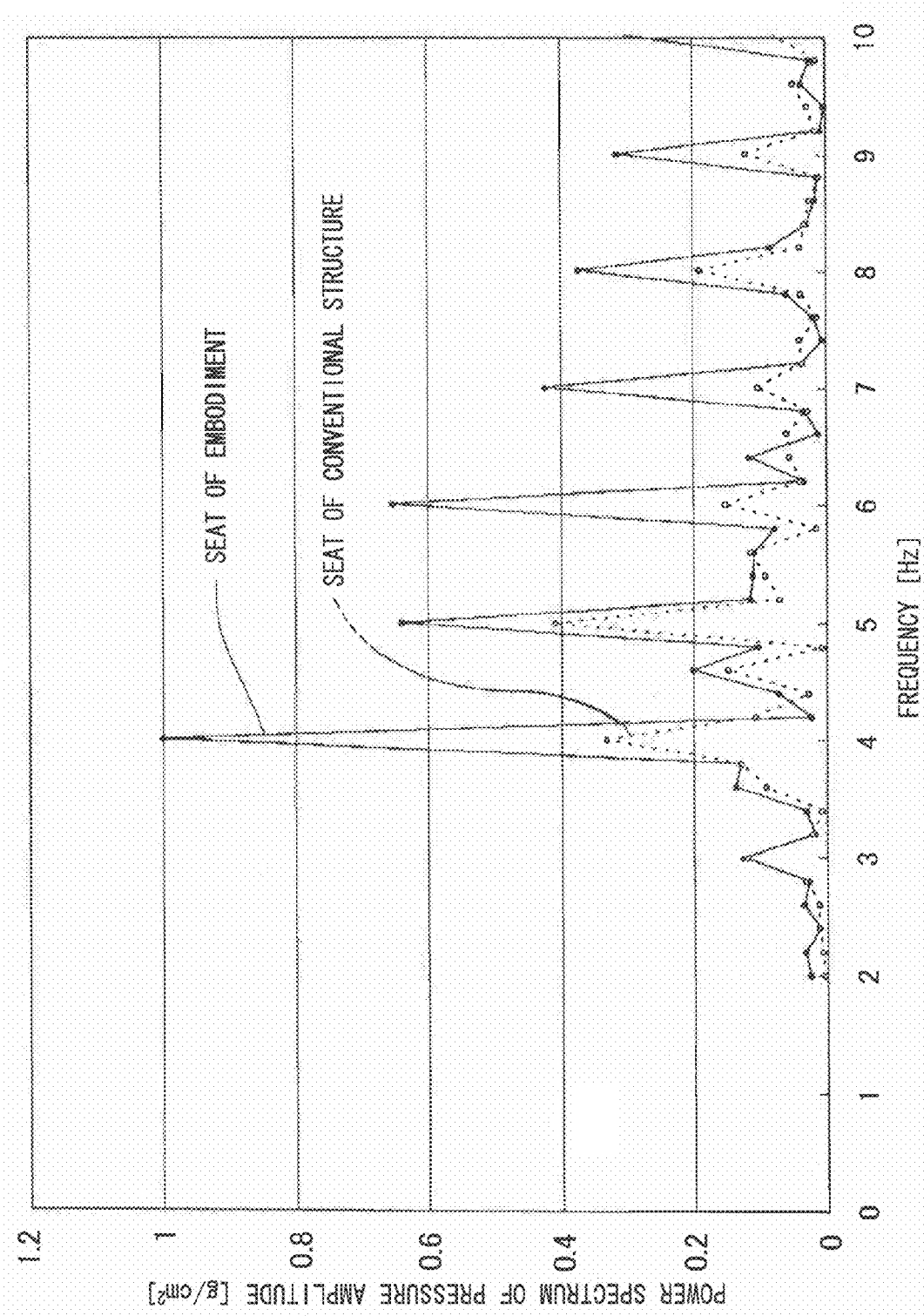

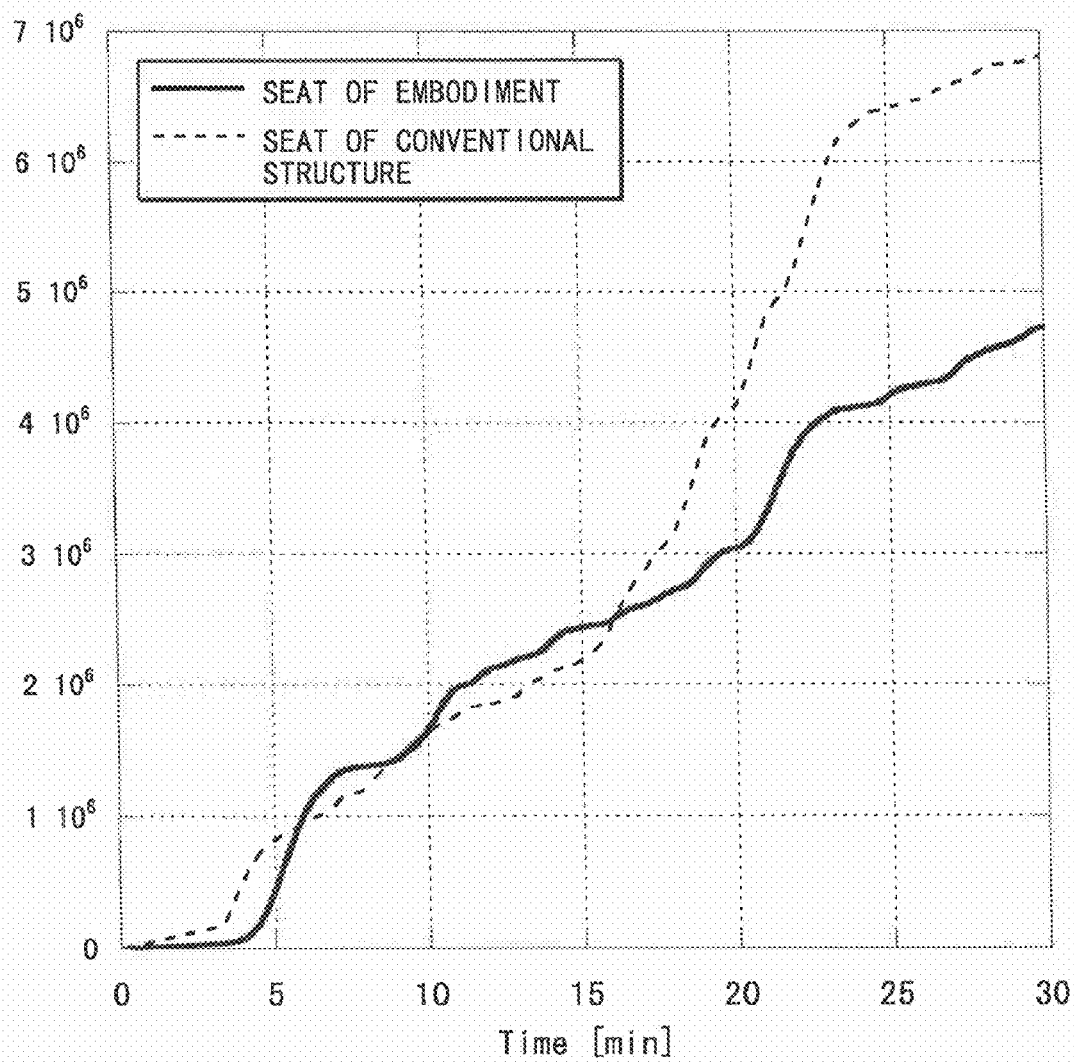

SEAT INCLUDING A TORSION BAR

TECHNICAL FIELD

The present invention relates to a seat for a vehicle such as an automobile.

BACKGROUND ART

As a technique to automatically distinguish whether a passenger seated in a seat is an adult or a child and to perform a feedback to an actuation control section of an air bag, for example, in order to automatically switch actuation control of the airbag, there is known a seat which has a mechanism for automatically detecting weight of a person. Usually, since a urethane foam is used as a cushioning member, a displacement amount of a coil spring supporting that urethane foam, the coil spring being disposed in a vertical direction in relation to a vehicle body floor, is measured to detect weight by the amount of displacement. On the other hand, the present applicant has disclosed a technique as Patent Document 1 in which a cushioning member provided in a seat cushion section is elastically supported by a torsion bar disposed in the seat cushion section and the torsion bar has a load fluctuation detecting device incorporated therein. More specifically, there has been disclosed a technique in which a pickup coil is wound on the above-described torsion bar and a reference bar (magnetic bar member) which is not distorted by a load fluctuation is provided, a pickup coil is wound also on the reference bar, and a load fluctuation is detected by calculating a difference of induced voltages obtained from two coils.
Patent Document 1: Japanese Patent Application Laid-open No. 2005-345257

DISCLOSURE OF THE INVENTION

Problems to be Solved by the Invention

Here, in order to detect a load by a load fluctuation detecting device more accurately, it is desirable that a seat has a structure in which a cushioning member has a high following ability to a human body motion and a vibration inputted from the outside can be efficiently damped. Improvement of such a vibration absorption characteristic is required not only in the load fluctuation detecting device but also in a case that a device for detecting a bio-signal of a human body by using an air pressure fluctuation is disposed, and is a theme which should be always pursued also in a seat which does not have a load information detecting means of such a kind. However, in a structure described in Patent Document 1, a supporting arm disposed in a neighborhood of a rear end of the seat cushion section rotationally supported by the torsion bar via an arm member is made to support a cushioning member made of a three-dimensional knitted fabric, thereby straining the cushioning member by using elasticity of the torsion bar, and a front end portion of the cushioning member is fixed to a frame. Thus, there is a room for further improvement in terms of a following ability to human body motion and vibration damping. Further, a seat structure disclosed in Patent Document 1 is suitable when using a strained three-dimensional knitted fabric or the like as a cushioning member, but application to a conventional well-known cushioning structure constituted by a cushioning pan and a urethane member disposed thereon is not referred to.

The present invention is made in view of the aforementioned problems, and is objected to provide a seat in which a cushioning member has a high following ability to a human body motion and which can damp vibrations inputted from the outside efficiently. Further, the present invention is also objected to provide a seat which, by incorporating a load information detecting means such as a load fluctuation detecting device and a bio-signal detecting device, is suitable for detecting biological information such as a load, respiration, a heart beat, and voice of a person, in which a vibration absorption characteristic is improved not only in a tension structure using a three-dimensional knitted fabric but also in a putting structure in which a urethane member is disposed, and which can detects the above biological information more sensitively.

Means for Solving the Problems

In order to solve the above problems, the seat of the present invention includes: a torsion bar disposed in one of a neighborhood of a front end and a neighborhood of a rear end of a seat cushion section along a width direction; a parallel link mechanism including a first link plate pivotally supported by the torsion bar, a second link plate pivotally supported by the other of the neighborhood of the front end and the neighborhood of the rear end of the seat cushion section, and a connection link plate connecting the first link plate and the second link plate, wherein operational directions of the first link plate and the second link plate are set to almost coincide with a vertical direction along a surface of a seat back section; and a cushioning member supported by the parallel link mechanism.

It is preferable that as the first link plate constituting the parallel link mechanism, an almost L-shaped link plate whose bent portion is pivotally supported by the torsion bar, whose front end is positioned forward of the torsion bar, and whose rear end is positioned below the torsion bar is used, and that as the second link plate, an almost L-shaped link plate whose bent portion is pivotally supported by the neighborhood of the rear end of the seat cushion section, whose front end is positioned forward of a pivotal support position of the bent portion, and whose rear end is positioned below the pivotal support position of the bent portion is used, and that the connection link plate is provided to connect rear ends of the first link plate and the second link plate. It is also preferable that the cushioning member disposed in the seat back section is disposed to be able to move vertically in accordance with an external vibration input.

It is preferable that the torsion bar is configured so that a restoring force does not work at a neutral point where no load is applied to the torsion bar, and it is configured so that, when the first link plate and the second link plate operate from the neutral point of the torsion bar in a top dead center direction or a bottom dead center direction, the torsion bar is twisted in one direction or in a reverse direction, thereby making the restoring force to restore the first link plate and the second link plate in a neutral point direction work. It is also preferable that a displacement range of each end portion of the first link plate and the second link plate is in a range of 15 to 100 mm in the vertical direction and in a range of 5 to 50 mm in a forward and backward direction.

It is preferable that the seat further includes a load information detecting means incorporated in an arbitrary region. The load information detecting means can be constituted by a load fluctuation detecting device mounted on the torsion bar. It is preferable that the load fluctuation detecting device includes s a reference bar made of a magnetic substance which is not distorted by a load fluctuation, as well as includes an exciting coil wound around the torsion bar and the reference bar in a bundle, a first pick up coil wound around the torsion bar, a second pick up coil wound around the reference bar, and a difference outputting means outputting a difference of output values between the first pick up coil and the second pick up coil. It is also preferable that the reference bar, the first pick up coil, the second pick up coil and the exciting coil of the load fluctuation detecting device are housed in a housing made of a magnetic substance, and further, it is preferable that the reference bar of the load fluctuation detecting device is molded with a synthetic resin and is housed in the housing.

It is also preferable that the load information detecting means is a bio-signal analyzing device which includes an air cushion that is disposed, in the seat back section, in at least one of positions corresponding to right and left iliocostalis lumborum muscles of a person in a vertically long state along the iliocostalis lumborum muscle and that has a length enabling its top end to be set at a height equivalent to a lower surface of a diaphragm of the person, and an analyzing means for analyzing a biological state of the person from an air pressure fluctuation of the air cushion generated by a bio-signal of the person.

EFFECTS OF THE INVENTION

A seat of the present invention is constituted to use a torsion bar and to support a cushioning member of a seat cushion section by a parallel link mechanism having a first link plate pivotally supported by the torsion bar, a second link plate disposed in correspondence with the first link plate, and a connection link plate connecting the first link plate and the second link plate, and operational directions of the first link plate and the second link plate are set to almost coincide with a vertical direction along a surface of a seat back section. Thus, when a human body is vibrated in a direction of rising upward by an input of an external vibration, the cushioning member of the seat back section moves diagonally upward and backward together with the human body, and when the human body falls downwards, the cushioning member of the seat back section moves in a direction in which haunches are pushed forward while the cushioning member moving downward together with the human body. At the same time, the cushioning member of the seat cushion section operates in a forward and backward direction in accordance with the external vibration input as above. As a result, since the cushioning member of the seat back section and the cushioning member of the seat cushion section in the seat of the present invention are supported by the above-described parallel link mechanism which is directly supported pivotally by the torsion bar, a rotational motion following a human body motion generated by an external vibration input is performed, so that a relative motion between a human body and the cushioning member is small and a resonance peak is lowered, whereby a vibration absorption characteristic can be improved.

It is preferable that the torsion bar is configured so that a restoring force does not work at a neutral point where no load is applied to the torsion bar. Thereby, when the first link plate and the second link plate operate from the neutral point of the torsion bar in a top dead center direction or a bottom dead center direction, the torsion bar is twisted in one direction or in a reverse direction to make the restoring force to restore the first link plate and the second link plate in a neutral point direction work. Therefore, in a state that a person is seated and the torsion bar is twisted from the neutral point in the bottom dead center direction, in a case of vibrating upward in a resonance zone in particular, a so-called a skyhook effect occurs in which an upward motion of a human upper body is restrained by using the restoring force of the torsion bar twisted in the top dead center direction exceeding the neutral point and viscosity and elasticity of the cushioning member of the seat back section. Further, since a following ability to a human body motion is high, if a load information detecting means such as a load fluctuation detecting device and a bio-signal detecting device is incorporated, measuring sensitivity thereof can be improved. It is particularly preferable that the cushioning member of the seat back section is disposed to be able to move vertically in accordance with an external vibration input, in order to further improve the following ability to the human body motion. It is also preferable that, in order to increase a braking capability of the first link plates and the second link plates at the top dead center and the bottom dead center, the top and the bottom dead centers are provided with stoppers such as rubber members, and by constituting so that any portion of the parallel link mechanism or of the frame member supported by the parallel link mechanism makes contact with the stopper, a braking force in a reverse direction of a motion direction of the parallel link mechanism or the like works, so that the vibration absorption function can be further improved.

BRIEF DESCRIPTION OF DRAWINGS

FIG. 1 is a perspective view showing a schematic configuration of a seat on which a load fluctuation detecting device according to an embodiment of the present invention is mounted;

FIG. 11 is a graph showing an output characteristic in a case that a gradual vibration is inputted;

FIG. 13 is a graph showing measured results of load-displacement characteristics of the seat used in the above-described embodiment and a seat of a conventional structure;

FIG. 14 is a graph showing acceleration transmissibilities of the seat used in the above-described embodiment and the seat of the conventional structure at a time that a vibration of a sine wave is applied;

FIG. 15 is a graph showing acceleration transmissibilities of the seat used in the above-described embodiment and the seat of the conventional structure at a time that a vibration of a random wave is applied;

FIG. 16 is a graph showing a relation between a frequency and a power spectrum of a pressure amplitude analyzed in a neighborhood of a position equivalent to a disposition position of a pelvic part supporting cushioning member;

FIG. 19 is a graph showing respective fatigue degrees of a case of being seated in the seat used in the above-described embodiment and of a case of being seated in the seat of the conventional structure.

Figure 2:
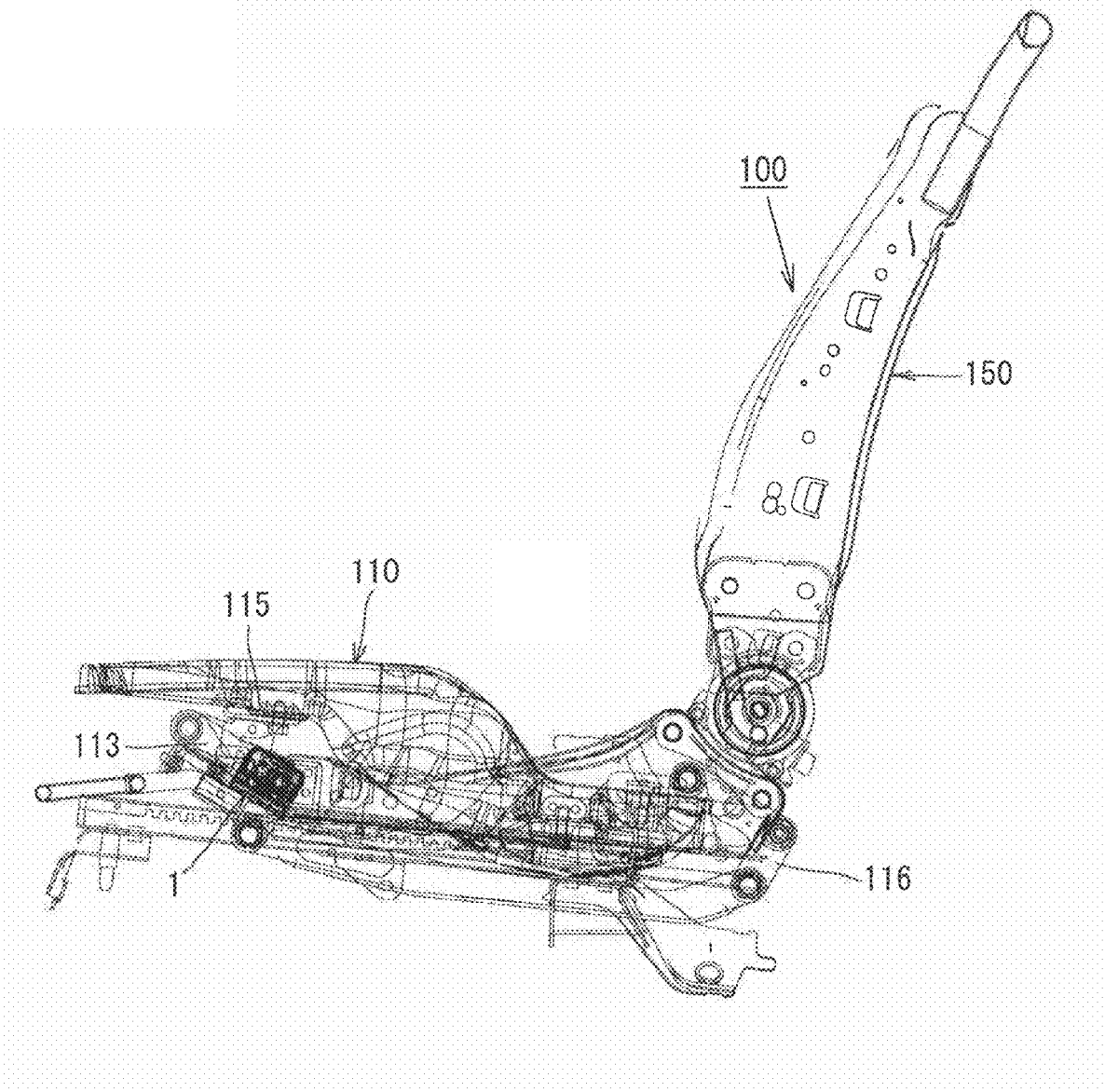
FIG. 2 is a side view showing a schematic configuration of the seat according to the above-described embodiment.

EXPLANATION OF REFERENCE NUMERALS 1 load fluctuation detecting device
100 seat
110 cushion frame
112 torsion bar
113 first link plate
116 second link plate
117 connection link plate
120 reference bar
112a first pick up coil
120a second pick up coil
121 exciting coil
150 back frame
200 air cushion
210 air pressure measuring instrument
220 analyzing means

BEST MODE FOR CARRYING OUT THE INVENTION

Hereinafter, the present invention will be explained in more detail based on an embodiment shown in the drawings. FIG. 1 to FIG. 7 are diagrams to explain a seat 100 in which a load fluctuation detecting device 1 according to an embodiment of the present invention is incorporated.

The seat 100 includes a seat cushion section 110 and a seat back section 150. The seat cushion section 110 includes side frames 111, 111, and in neighborhoods of their front ends, a torsion bar 112 being part of the load fluctuation detecting device 1 is provided along a width direction. Bent portions of first link plates 113, 113 which are formed to have almost L shapes are pivotally supported by the respective end portions of the torsion bar 112, so that the torsion bar 112 can be twisted by displacement in a rotational direction of the first link plates 113, 113. The almost L-shaped first link plates 113, 113 are provided in a manner that their front ends are placed forward of a disposition position of the torsion bar 112 and their rear ends are positioned below the disposition position of the torsion bar 112, and between the front ends of the first link plates 113, 113, a front edge portion supporting frame 114 is bridged. Further, in the present embodiment, front mounting brackets 115, 115 for mounting a cushioning pan on which a urethane member being a cushioning member is put are provided in the first link plates 113, 113.

In neighborhoods of rear ends of the side frames 111, 111, almost L-shaped second link plates 116, 116 which are formed to have almost L shapes and whose bent portions are pivotally supported by the side frames 111, 111 are provided. Further, the almost L-shaped second link plates 116, 116 are provided in a manner that their front ends are positioned forward of pivotal support positions of the bent portions and their rear end are positioned below the pivotal support positions of the bent portions. Besides, a connection link plate 117 is bridged between the rear end of the second link plates 116, 116 and the rear end of the first link plates 113, 113 described above, and a parallel link mechanism is formed by the first link plates 113, 113, the second link plates 116, 116, and the connection link plate 117. Further, in the present embodiment, rear mounting brackets 118, 118 for mounting the cushioning pan on which the urethane member as the cushioning member is put is provided in the front ends of the second link plates 116, 116.

Here, the torsion bar 112 is configured so that a restoring force does not work at a neutral point (see FIG. 3) where a load is not applied to the torsion bar 112. Thereby, when the first link plates 113, 113 and the second link plates 116, 116 operate in a top dead center direction or a bottom dead center direction from the neutral point of the torsion bar 112, the torsion bar 112 is twisted in one direction or in a reverse direction and a restoring force to restore the first link plates 113, 113 and the second link plates 116, 116 in a neutral point direction works. In a state that a person is seated and static, the respective link plates 113, 113, 116, 116 operate from the neutral point in the bottom dead center direction, and thereby, a range from the neutral point to the bottom dead center is a range in which weight is detectable by a later-described load fluctuation detecting device 1. In a case that an external vibration in a vertical direction is inputted within the above range, if, for example, a vibration in an upward direction leading to operation exceeding the neutral point is inputted, the restoring force of the torsion bar 112 once returns to zero at the neutral point and then the torsion bar 112 is twisted in the top dead center direction, so that the restoring force to restore in the bottom dead center direction starts to work. It should be noted that details thereof will be described later.

Figure 5:
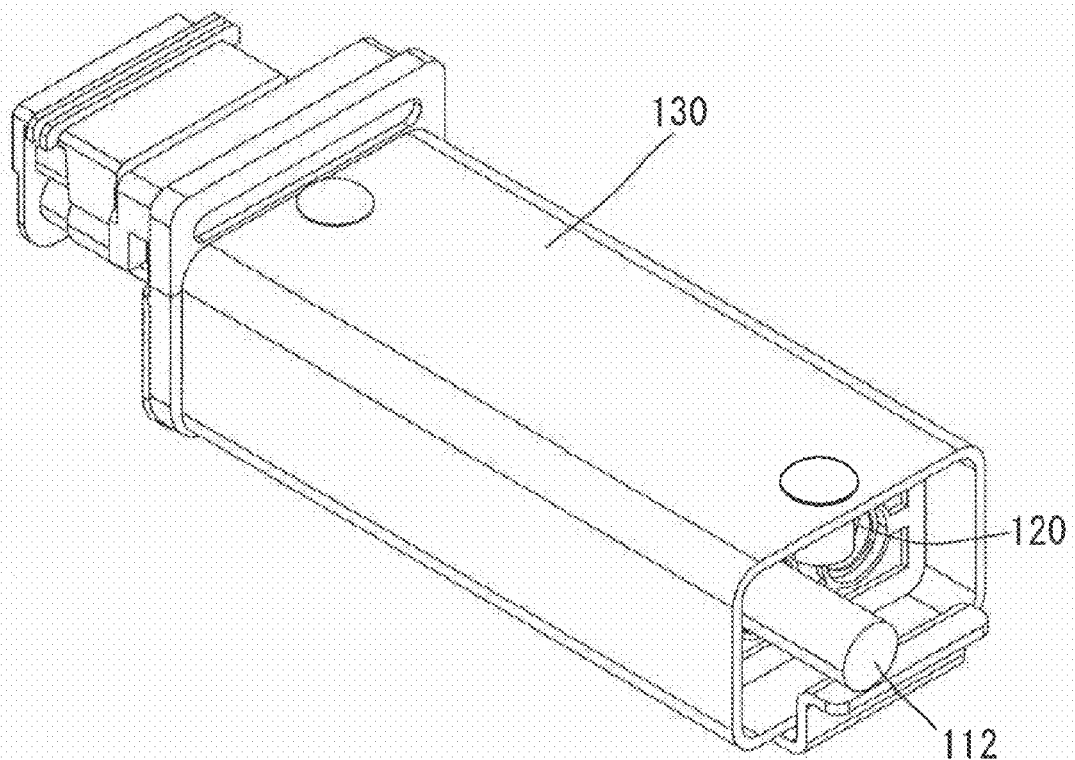
FIG. 5 (a) and FIG. 5 (b) are views showing an external appearance of the load fluctuation detecting device used in the above-described embodiment, FIG. 5 (a) being a perspective view and FIG. 5 (b) being an end view.
Figure 5:
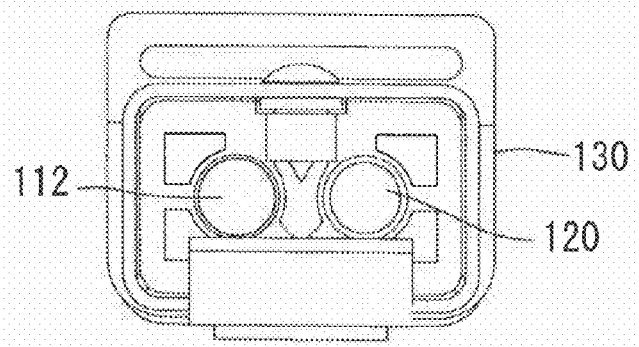
Figure 6:
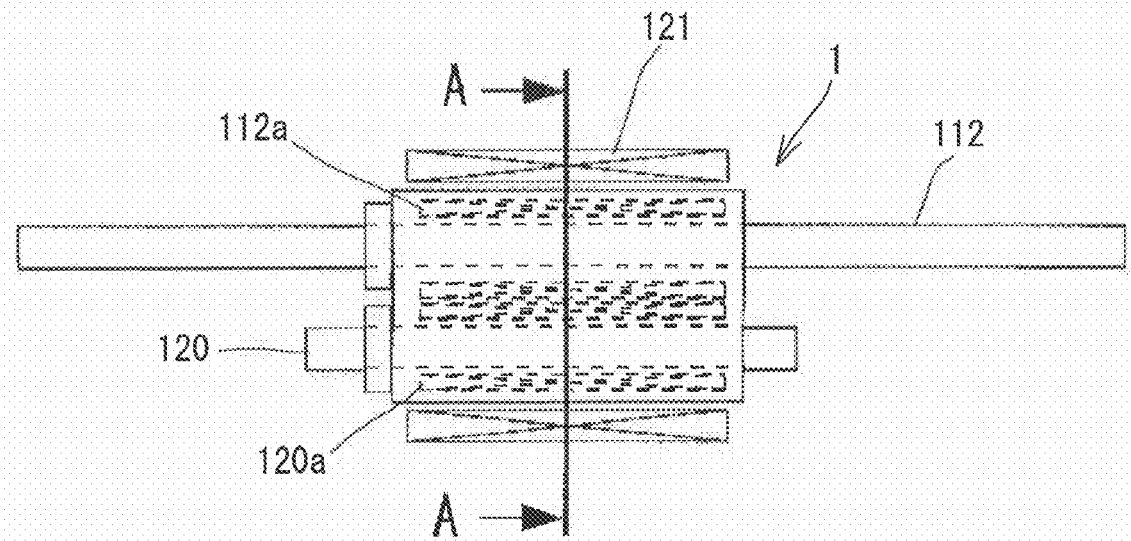
FIG. 6 is a view showing a concrete configuration of the load fluctuation detecting device according to the above-described embodiment.
Figure 7:
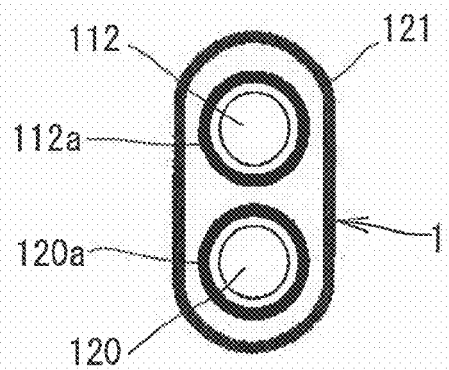
FIG. 7 is an A-A line cross-sectional view of FIG. 6.

On the other hand, the load fluctuation detecting device 1 used in the present embodiment is constituted, as shown in FIG. 5 to FIG. 7, by the torsion bar 112 described above and a reference bar 120 provided parallelly to the torsion bar 112. As for the torsion bar 112, as described above, the cushioning pan and the urethane member are disposed on the first link plates 113, 113 and the second link plates 116, 116 via the mounting brackets 115, 118, respectively, and so, when a person is seated, a twist angle changes at a time that a load fluctuation occurs in such a case that a body motion occurs due to a respiration or the like. In contrast, the reference bar 120 is disposed in a manner not to be twisted by such a load fluctuation, that is, in a manner not to be distorted. It suffices if the reference bar 120 is not disposed parallelly to the torsion bar 112, as long as the reference bar 120 is not distorted by the load fluctuation, and it is possible to obtain a later-described difference of output values also thereby, but, parallel disposition as shown in the drawing contributes to space saving. In view of its function, the reference bar 120 can be shorter or longer than the torsion bar 112, and the entire reference bar 120 and part of the torsion bar 112 are provided being housed in a housing 130.

More specifically, as shown in FIG. 6 and FIG. 7, a first pick up coil 112a is provided wound in one direction around the torsion bar 112, while a second pick up coil 120a is provided wound in a direction reverse to that of the first pick up coil 112a around the reference bar 120. Then, an exciting coil 121 is wound around the above.

It is preferable that the housing 130 in which the torsion bar 112, the first pick up coil 112a, the reference bar 120, the second pick up coil 120a, and the exciting coil 121 are housed is formed of a magnetic substance such as iron. If the housing 130 is made of a synthetic resin, moving of some magnetic substance (for example, part of a member constituting an iron frame) existing in its periphery sometimes changes magnetoresistance and an output value differs even if the twist angle of the torsion bar 112 is constant. However, by using the housing 130 made of the magnetic substance, such an influence of magnetism by such a peripheral magnetic substance can be prevented. Further, it is preferable that the reference bar 120 is molded with a synthetic resin and housed in the housing 130. Thereby, an influence by aging, such as rust, can be restrained.

Figure 3:
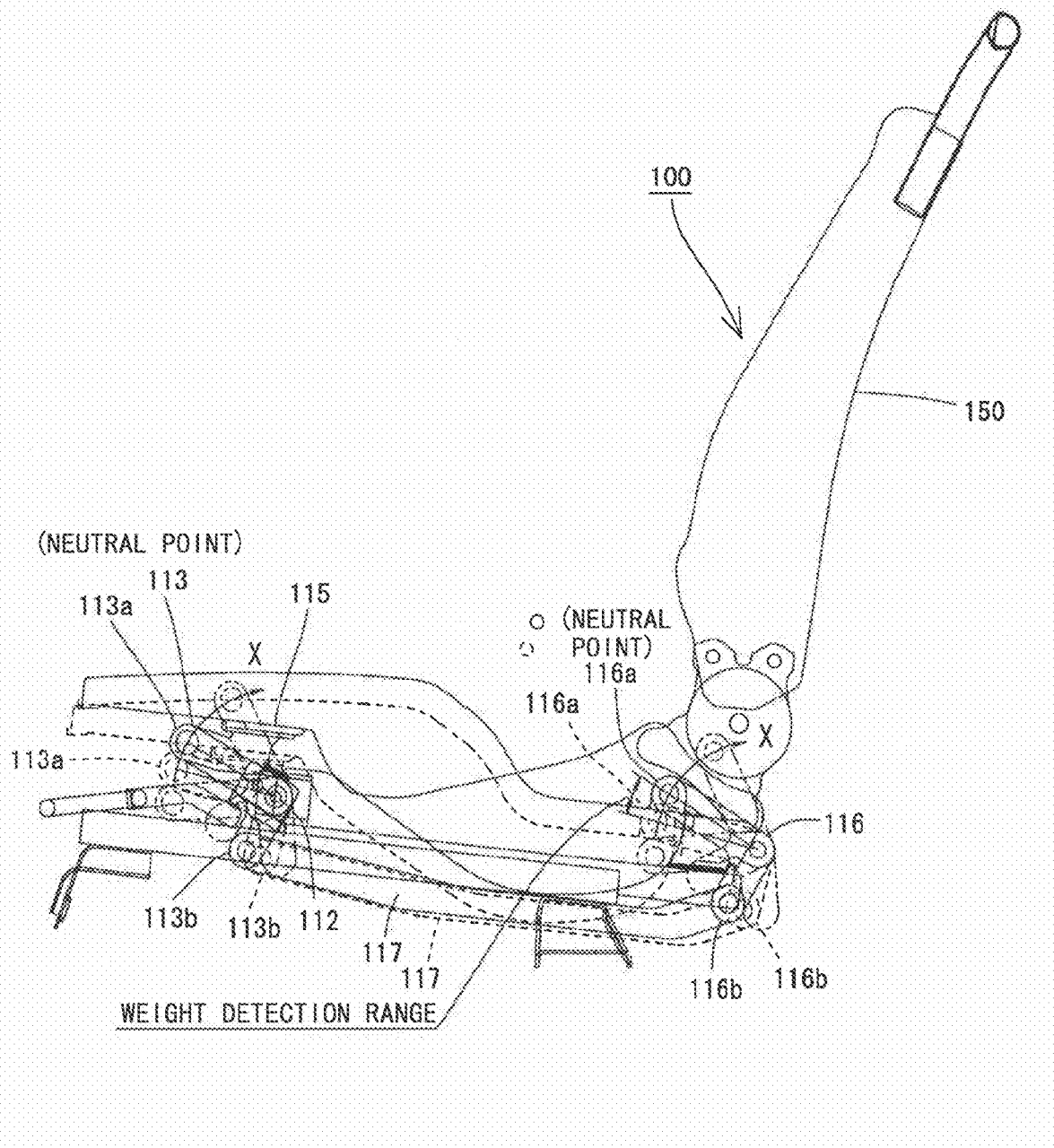
FIG. 3 is a side view for explaining a function of the seat according to the above-described embodiment.

According to the present embodiment, an induced current flows from a not-shown AC power source to the exciting coil 121. As shown in FIG. 3, when a person is seated, the respective link plates 113, 116 are displaced from positions indicated by solid lines to positions indicated by broken lines. More specifically, front ends 113a of the first link plates 113, 113 are displaced diagonally forward and downward with the bent portions pivotally supported by the torsion bar 112 being centers, while rear ends 113b are displaced diagonally backward and downward. Further, with regard to the second link plates 116, 116 connected to the first link plates 113, 113 via the connection link plate 117, front ends 116a are displaced diagonally forward and downward with the pivotally supported bent portions being centers, while rear ends 113b are displaced diagonally backward and downward. Thereby, the twist angle of the torsion bar 112 changes and a predetermined induced current is outputted from the first pick up coil 112a. A difference between an output value thereof and an output value from the second pick up coil 120a is calculated by a difference outputting means constituted by a control circuit. This output value voltage is compared with a table or a graph in which a correlation with a load is shown, whereby the load is specified. On the other hand, when a vibration in the vertical direction is inputted in a state of being seated, since the first link plates 113, 113 and the second link plates 116, 116 constituting this parallel link mechanism operate in a direction along a torso line at a time of being seated, when a vibration in the upward direction is inputted, the first link plates 113, 113 and the second link plates 116, 116 operate in a direction (direction of an arrow X in FIG. 3) to press a person against the seat back section 150.

Figure 9:
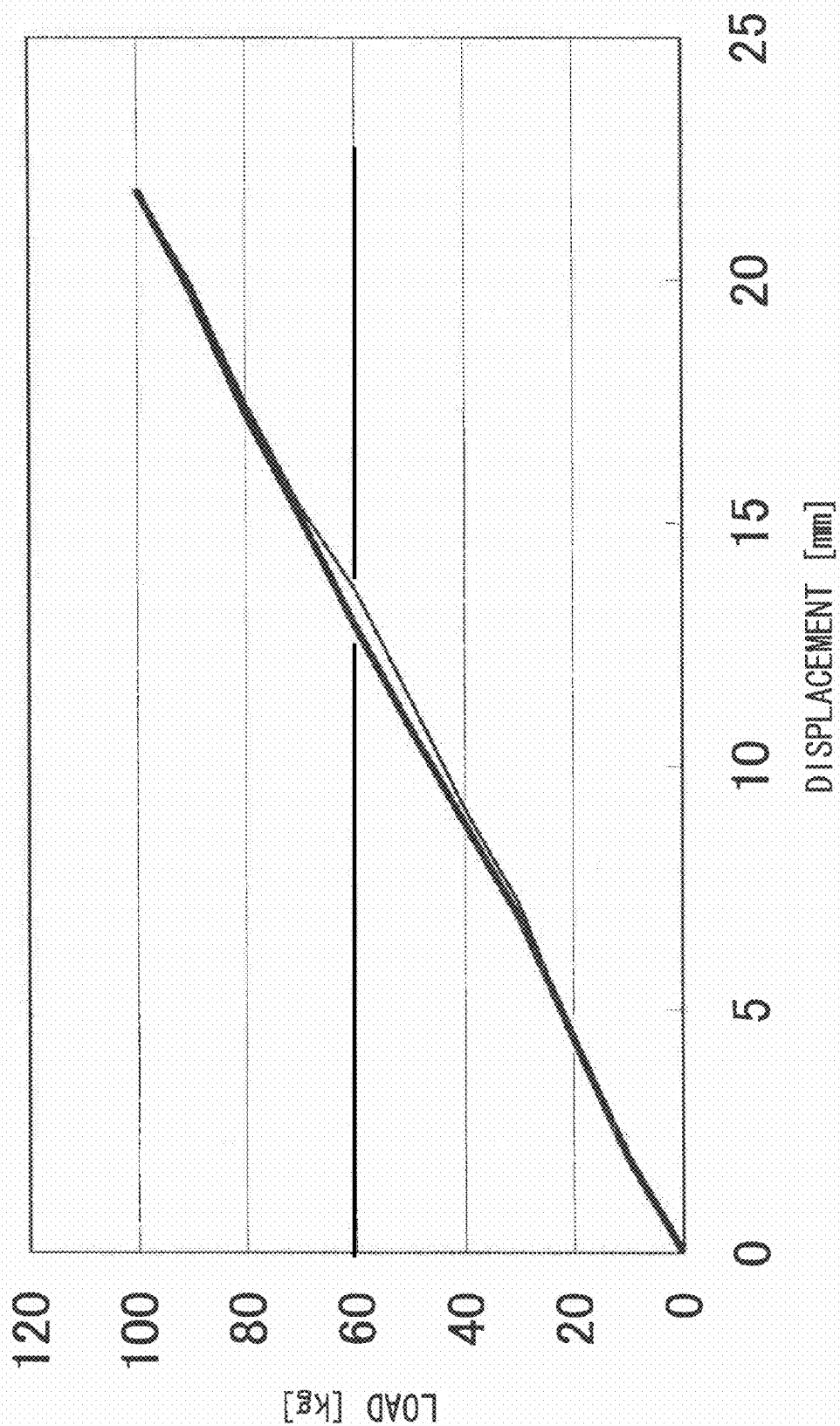
FIG. 9 is a graph showing a load-displacement characteristic of a parallel link mechanism of the above-described embodiment.

In the seat 100 of the present embodiment, as described above, the cushioning member is supported by the parallel link mechanism formed by the first link plates 113, 113, the second link plates 116, 116, and the connection link plate 117, and the front ends 113a and rear ends 113b of the first link plates 113, 113 and the front ends 116a and rear ends 116b of the second link plates 116, 116 are configured to perform rotational motions bringing displacement not only in the vertical direction but also in a forward and backward direction. Therefore, since an external vibration input is converted into the rotational motion, compared with a case of vibration damping by a reciprocating motion in a vertical direction, friction or the like is small and a hysteresis loss in a load-displacement characteristic at a time of displacement due to a load fluctuation is small. FIG. 9 is a graph showing a load-displacement characteristic measured in a state that a cushioning member of a urethane member or the like is not mounted on the seat cushion section 110 and only a cushioning pan is mounted on the front mounting brackets 115, 115 and the rear mounting brackets 118, 118. As is obvious from this graph, the parallel link mechanism of the present embodiment in a state that damping of the cushioning member of the urethane member is not functioning is a mechanism in which a hysteresis loss is quite small and structural damping is small, since a rotational axis of the first link plates 113, 113 is the torsion bar 112 and a spring force works on the rotational axis of the first link plates 113, 113.

Figure 10:
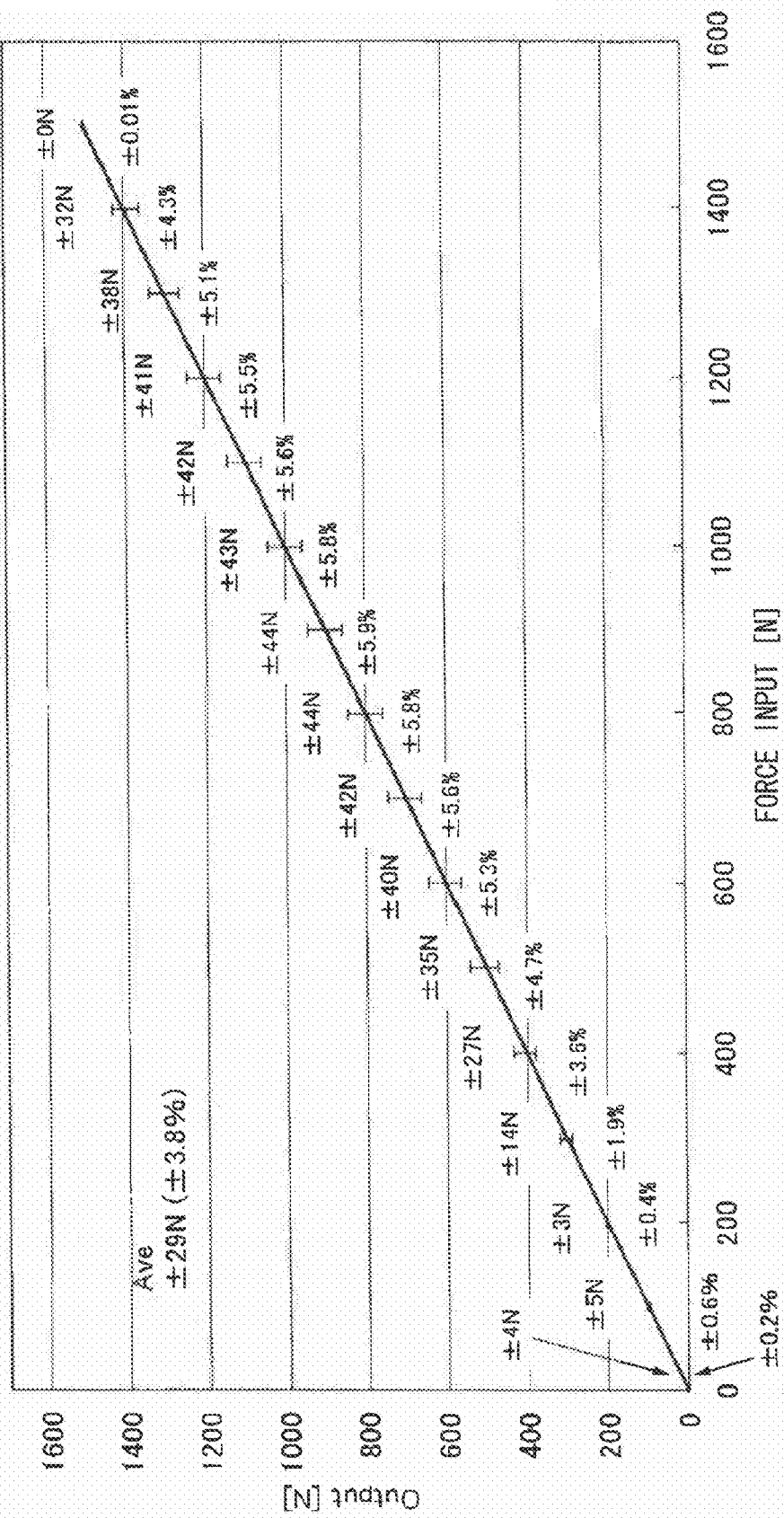
FIG. 10 is a graph showing an output characteristic of a torsion bar used in the above-described embodiment.

On the other hand, an output characteristic in a case that the torsion bar 112 is slowly twisted by itself is shown in FIG. 10. Here, there are measured an output load corresponding to an output voltage value measured by the above-described load fluctuation detecting device 1 at a time that the torsion bar 112 is twisted in one direction, and an output load at a time that the torsion bar 112 is twisted in a predetermined angle in one direction and thereafter returns in a reverse direction. For example, there is a difference of ±44 N (that is, 88 N) in output values between an output load for an input load of 800 N at a time of twisting in one direction and an output load for an input load 800 N at a time of returning in the reverse direction. This difference has an influence on accuracy of the load fluctuation detecting device 1, and so a smaller difference is more preferable.

However, as a practical matter, when a person is seated in the seat 100 or when an external vibration is inputted, the torsion bar 112 is not twisted slowly but is twisted quickly, and thereafter, the torsion bar 112 performs a rotational motion to be returned in the other direction by a load input. As shown in FIG. 9, in the parallel link mechanism of the present embodiment, a hysteresis loss is quite small and a damping ratio is small. Thus, in the parallel link mechanism of the present embodiment, after a load such as an external vibration is inputted, there occurs "gradual vibration" in which vibration is not damped quickly and an amplitude becomes gradually small. Therefore, to measure a human load by the load fluctuation detecting device 1 in an actual vehicle, since the torsion bar 112 is not rotation displaced slowly, it is necessary to compare an output characteristic in a case that such a "gradual vibration" occurs.

FIG. 11 is a measurement result of an output load obtained from the load fluctuation detecting device 1 in a case that gradual vibrations of input amplitudes of 40 N, 80 N, 120 N, and 160N are inputted in the vertical direction of the parallel link mechanism. In an example of the input load of 800 N, variations of output loads are 47 N in a case of the input amplitude of 40 N, 38 N in a case of the input amplitude of 80 N, 31 N in a case of the input amplitude of 120 N, and 23 N in a case of the input amplitude of 160N, being almost equal to or less than a half of the variation of 88 N of the output load for the input load of 800 N at a time that the torsion bar 112 is twisted slowly. Thereby, it is found that the parallel link mechanism of the present embodiment including the torsion bar as a direct rotational axis is suitable for accurate load fluctuation detection.

Figure 12A:
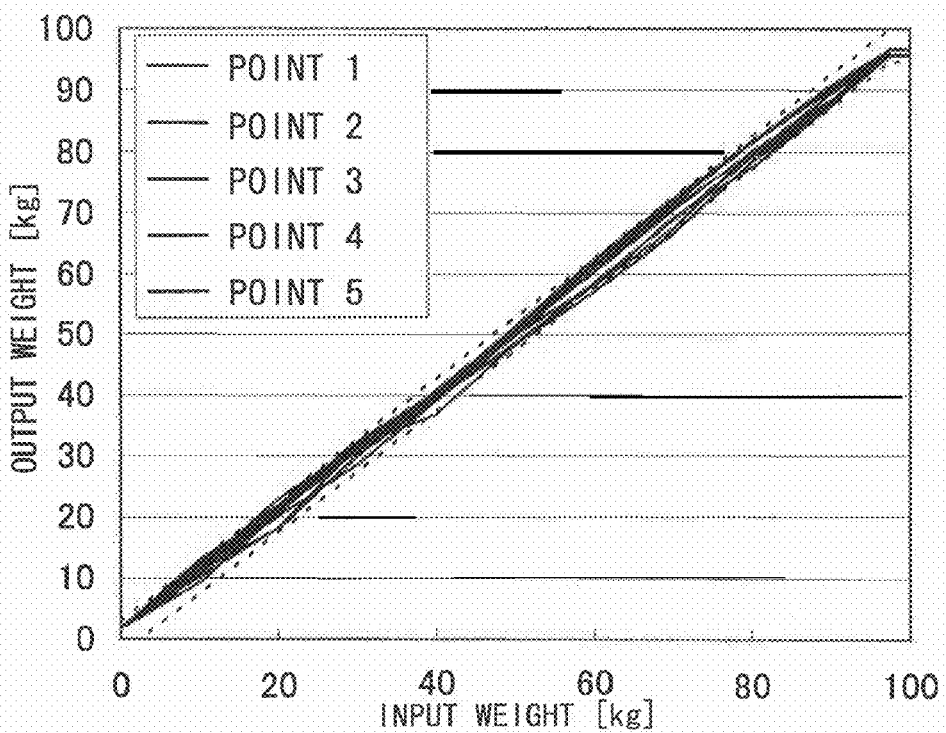
FIG. 12 (a) and FIG. 12 (b) are a graph and a diagram showing differences in output characteristics of input loads by an input region in a seat cushion section.
Figure 12B:
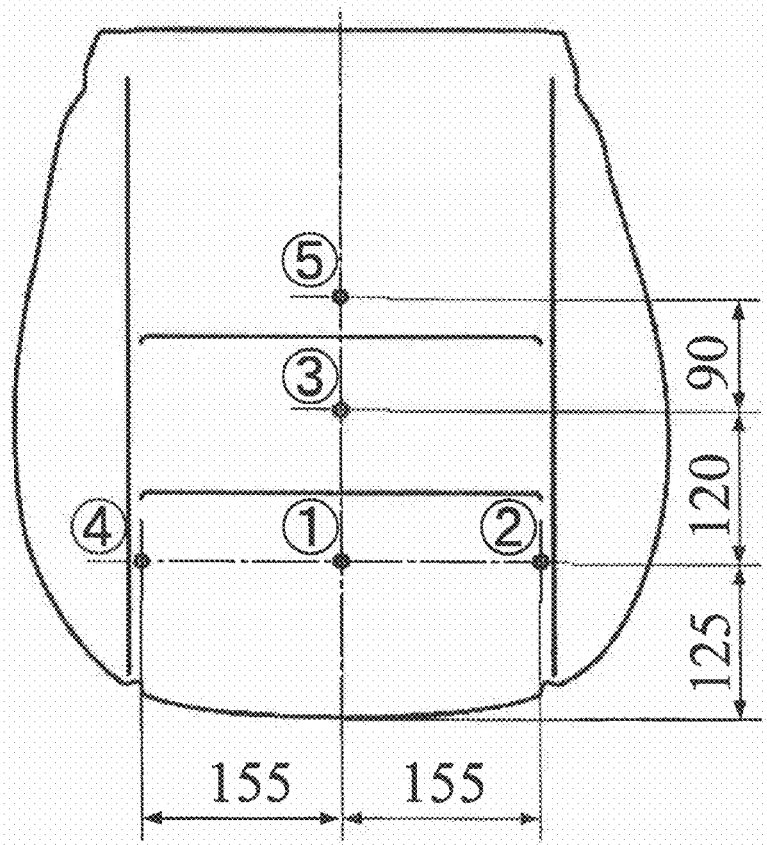
Figure 17A:
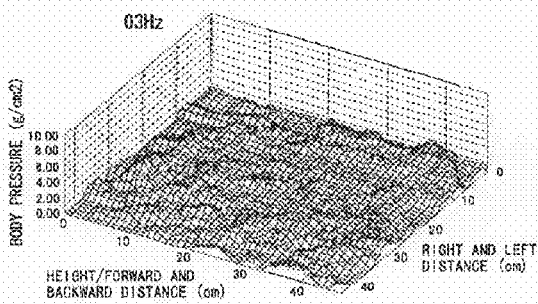
FIG. 17 (a) to FIG. 17 (h) are diagrams showing body pressure distributions in the seat back section of the seat used in the above-described embodiment for frequencies from 3 Hz to 10 Hz.
Figure 17E:
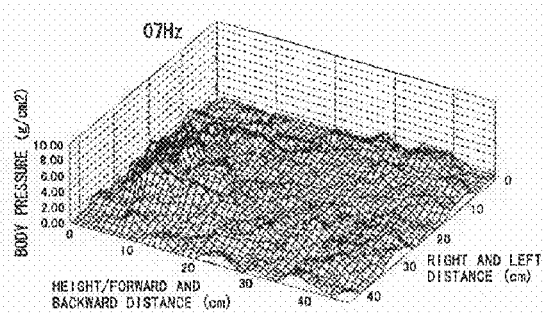
Figure 17B:
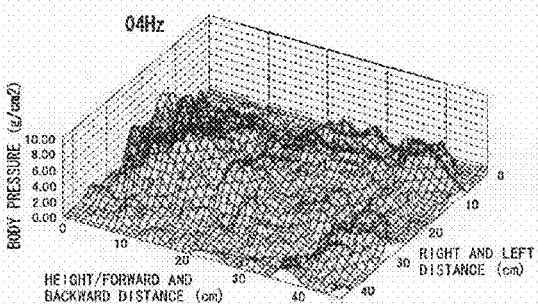
Figure 17F:
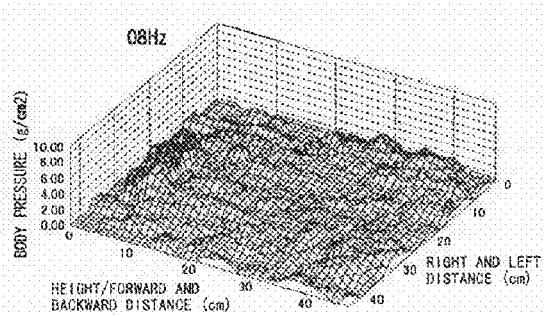
Figure 17C:
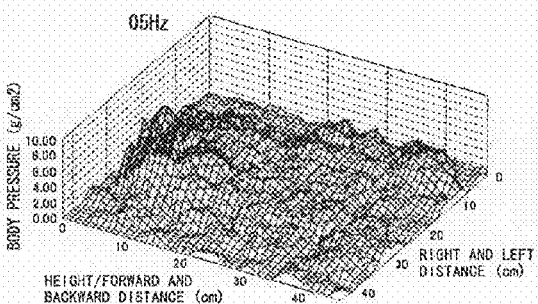
Figure 17G:
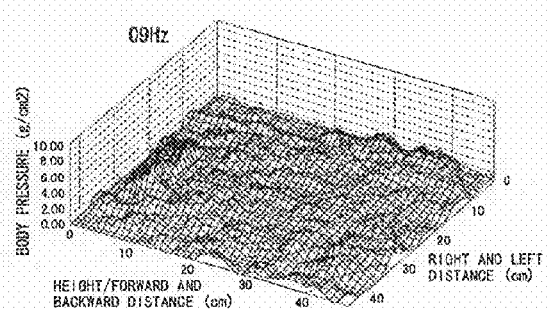
Figure 17D:
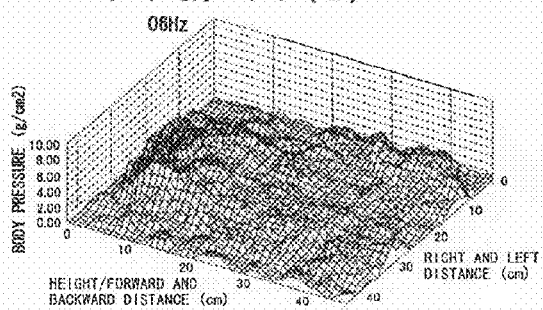
Figure 17H:
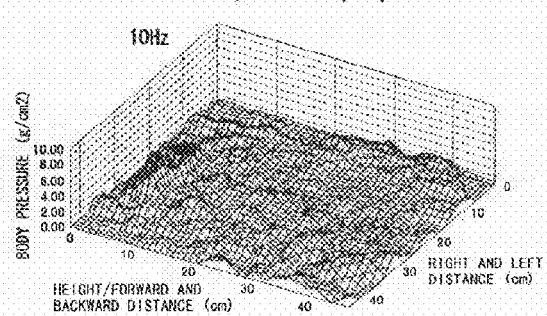
Figure 18A:
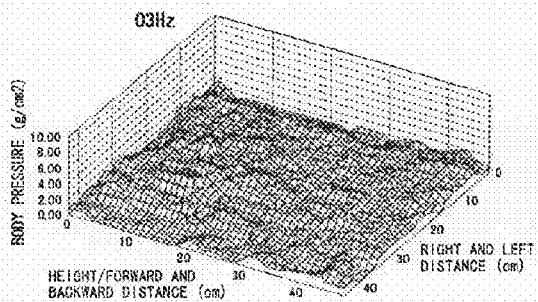
FIG. 18 (a) to FIG. 18 (h) are diagrams showing body pressure distributions in a seat back section of the seat of the conventional structure for frequencies from 3 Hz to 10 Hz.
Figure 18E:
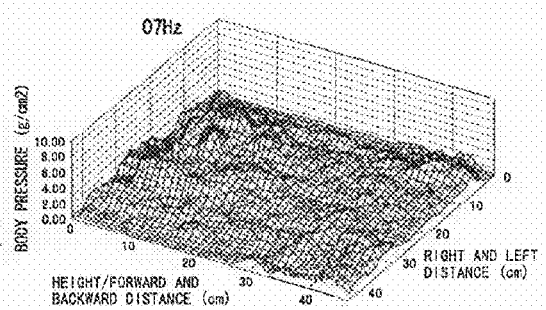
Figure 18B:
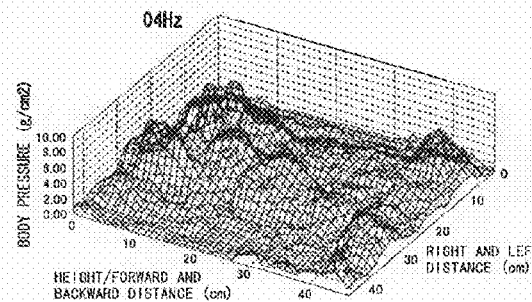
Figure 18F:
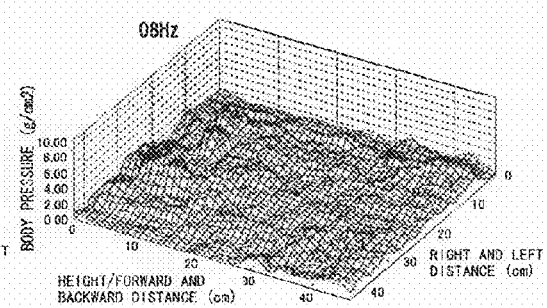
Figure 18C:
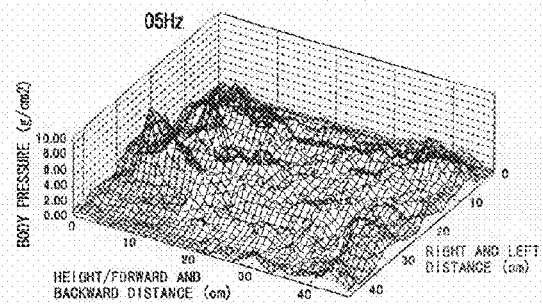
Figure 18G:
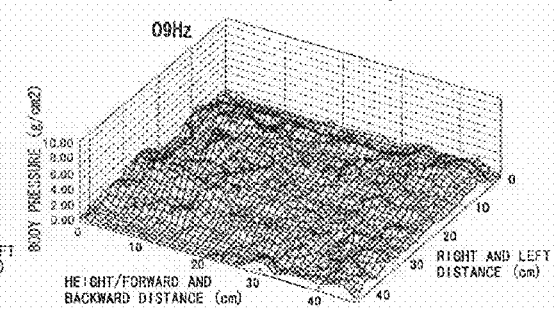
Figure 18D:
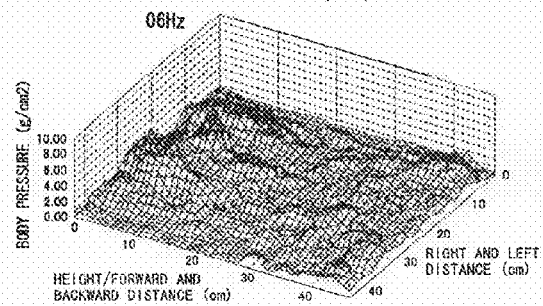
Figure 18H:
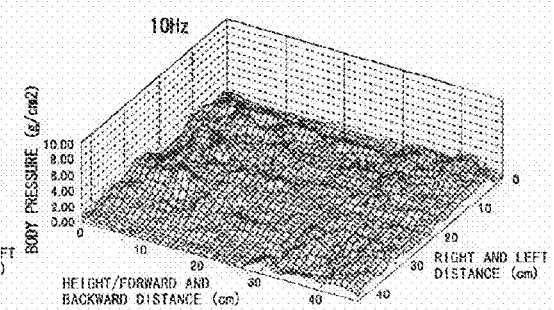

Further, as shown in FIG. 12 (a) and FIG. 12 (b), loads are inputted in five points of point 1 to point 5 shown in FIG. 12 (b) in the seat cushion section 110 to investigate a difference in the output loads by the portion, and it is found that the difference is in a range of 54 N at a maximum as shown in FIG. 12 (a), and that also in that respect the parallel link mechanism of the present embodiment is suitable to accurate load fluctuation detection. In order to obtain the above-described characteristic, the respective ends 113a, 113b, 116a, 116b of the first link plates 113, 113 and the second link plates 116, 116 are required to be displaced in a rotational direction, and it is preferable that displacement ranges of the respective ends 113a, 113b, 116a, 116b of the respective link plates 113, 116 are set to be in a range of 15 to 100 mm in the vertical direction and in a range of 5 to 50 mm in the forward and backward direction.

On the other hand, the small damping rate of the parallel link mechanism as described above is not advantageous in terms of vibration damping. Thus, in the present embodiment, as described above, operational directions of the first link plates 113, 113 and the second link plates 116, 116 are set to almost coincide with the vertical direction along a surface of the seat back section 150, by constituting the parallel link mechanism in a manner that the torsion bar 112 is pivotally supported by the bent portions of the almost L-shaped first link plates 113, 113. In consequence, when a human body is vibrated in a direction of rising upward by an input of an external vibration, the cushioning member of the seat back section 150 moves diagonally upward and backward together with the human body, and when the human body falls downwards, the cushioning member of the seat back section 150 moves in a direction in which haunches are pushed forward while moving downward together with the human body. At the same time, the cushioning member of the seat cushion section 110 operates in the forward and backward direction in accordance with such an external vibration input. Thus, it is preferable that the cushioning member disposed in the seat back section 150 is provided in a manner to be able to move virtually in accordance with an external vibration input.

Figure 4:
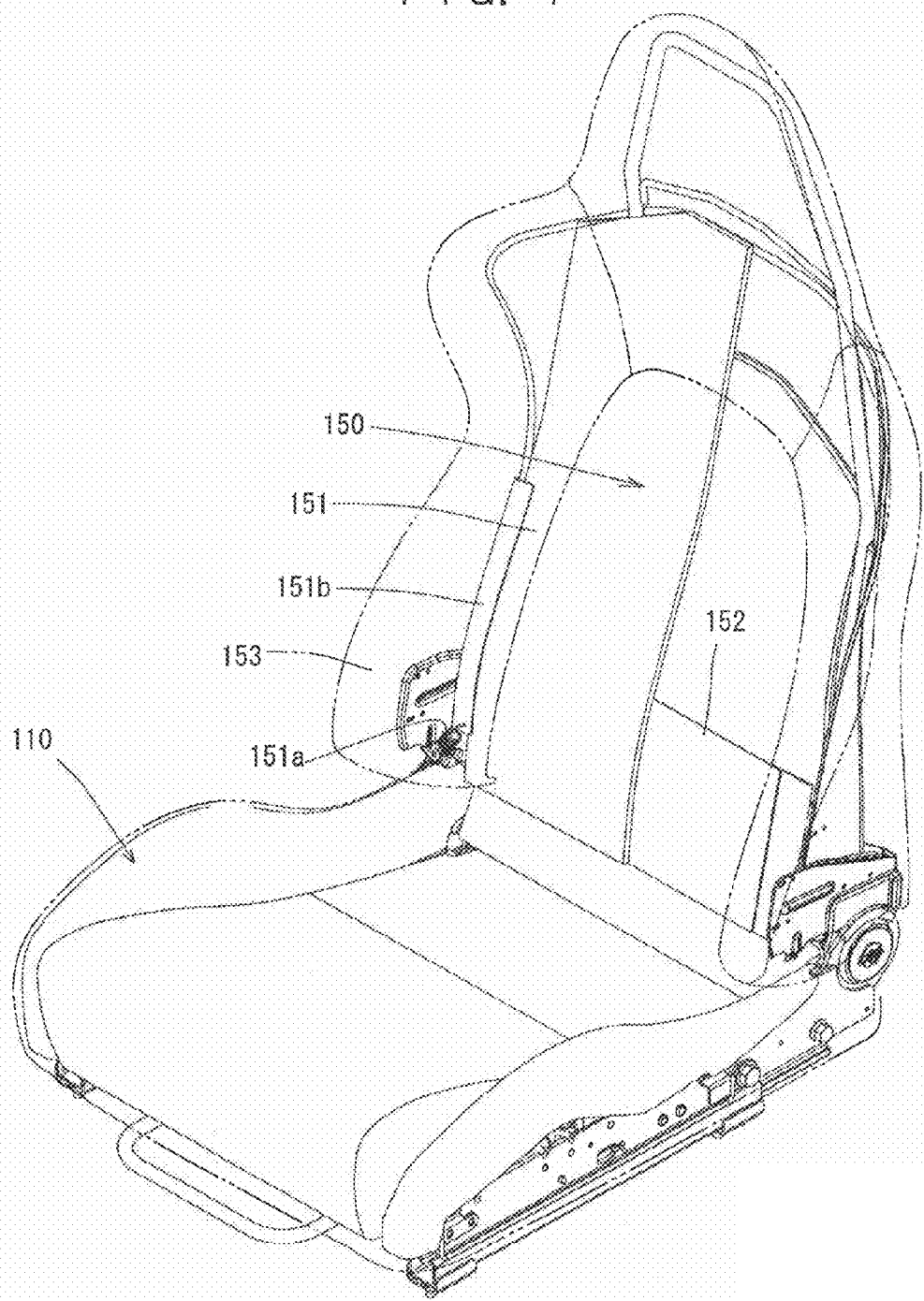
FIG. 4 is a view for explaining a means for enabling a cushioning member of a seat back section of the seat according to the above-described embodiment to move vertically.

Here, the cushioning member in the present embodiment means a cushioning member of a surface layer disposed as a surface skin in a side nearest to a human body as well as a variety of cushioning members disposed therebehind. FIG. 4 shows, as a cushioning member of the seat back section 150, a structure constituted by a cushioning member 153 of a surface layer, a base cushioning member 151 disposed in a back surface side of the cushioning member of the surface layer, and a pelvic part supporting cushioning member 152 disposed further in a back surface side of the base cushioning member 151. Among these, a bottom edge of the base cushioning member 151 is supported by the coil spring 151a coupled with the frame disposed in a neighborhood of a rear portion of the seat cushion section 110, and an engaging resin member 151b which has a low friction coefficient is attached to a side edge of the base cushioning member 151, and this engaging resin member 151b is engaged with a frame member disposed in a neighborhood of a side edge of the seat back section 150 along the vertical direction, whereby the base cushioning member 151 is structured to be able to vibrate vertically. The pelvic part supporting cushioning member 152 is strained between side frames of the seat back section 150 along a width direction and configured to support a neighborhood of a pelvis while slightly applying a pressure. It should be noted that a function of a force of the pelvic part supporting cushioning member 152 pressing a neighborhood of from a pelvis to a lumbar part of a human body will be described later. Thereby, the cushioning member of the seat back section 150, especially the base cushioning member 151, is easy to move in the vertical direction along a torso line at the time of being seated in accordance with behavior when the human body vibrates when an external vibration is inputted, so that a relative motion between the human body and the cushioning member is made small. In consequence, detection characteristics of not only the above-described load fluctuation detecting device but also a later-described bio-signal detecting device can be improved.

FIG. 13 is a graph obtained by investigating a load-displacement characteristic measured in a state that a urethane member is supported by a cushioning pan which is supported by the parallel link mechanism of the present embodiment and a load-displacement characteristic of a seat (seat of conventional structure) in which a urethane member put on a cushioning pan of a conventional structure not using a parallel link mechanism. As is obvious from this graph, in the seat of the present embodiment, a spring constant is smaller than in the seat of the conventional structure, and the load fluctuation is small in a neighborhood of a displacement amount of 20 to 60 mm, so that a nonlinear variation characteristic with a high vibration damping property can be obtained.

Here, vertical direction vibration inputs which a person feels unpleasant are divided into two vibration modes. Unpleasant feelings are a feeling of bobbing by a body quaking and a feeling of trembling by an internal organ resonating, and such vibrations occur in a neighborhood of 5 Hz and in a neighborhood of 8 Hz. In particular, a motion of the lumbar part has distinctive features. With the vibration in the neighborhood of 5 Hz, an upper body of a person hardly moves, but below a breast part, a bend of an entire spine such as rotational motion occurs in a forward and backward direction around a breast. The vibration in the neighborhood of 8 Hz causes a vertical motion in the spine with haunches serving as a spring. However, because of curvature of a lumbar vertebra which occurs simultaneously, the motion of the upper body is restrained. Further, when masses of a head part and the breast part are added to an upper portion of the spine, the motion of the upper spine is further restrained. A person with a larger head part mass balance is less influenced by a backrest, while a small person with a smaller head feels a knock or a back slap from the backrest more sensitively. Therefore, it is preferable that the cushioning member such as a three-dimensional knitted fabric which is provided in the seat cushion section 110 and the seat back section 150 is configured to properly follow such a human motion corresponding to the vibration input in order to restrain a vibration transmitted to the human body.

FIG. 14 is data obtained by measuring an acceleration transmissibility (G/G) of the seat 100 of the above-described embodiment supported by the parallel link mechanism whose load-disposition characteristic is measured in FIG. 13 and an acceleration transmissibility (G/G) of the seat of the conventional structure. The acceleration transmissibility (G/G) is measured in a state that the respective seats described above are mounted on a platform of a vibrator, an acceleration sensor is attached in neighborhoods of portions corresponding to below an ischial tuberosity of the seat cushion section 110, a Japanese male of 68 kg in weight is seated in each seat for a vehicle, and a vibration is applied by using a sine wave of one side amplitude of 1 mm (amplitude between upper and lower peak is 2 mm) with a vibration frequency being changed from 0.5 Hz to 15 Hz during 180 seconds. Further, FIG. 15 is a graph showing an acceleration transmissibility (G/G) in a case that a vibration is applied by using a random wave.

As is obvious from FIG. 14 and FIG. 15, it is found that in the seat 100 of the above-described embodiment, a resonance point is lower than in the seat of the conventional structure and a vibration absorption characteristic in a high frequency band of equal to or higher than 8 Hz is substantially improved. Normally, when a spring constant becomes small, a resonance point shifts toward a low frequency and a gain increases. However, the present embodiment is structured to have an ability to follow a human motion responding to a vibration input because of the parallel link mechanism and a vertical motion mechanism of the cushioning member of the seat back section 150 described above. Therefore, as for a human motion along the surface of the seat back section by the parallel link mechanism, when the cushioning member constituting the seat back section 150 is made of a three-dimensional knitted fabric, relative displacement between the three-dimensional knitted fabric and the person becomes small due to friction, viscosity, and elasticity, and in the present embodiment a sky-hook effect as if dogging occurs as a result that the restoring force in the bottom dead center direction is also added as the torsion bar 112 is further twisted exceeding the neutral point. Further, in a neighborhood of from a pelvic part to a lumbar part of a person, a friction force by a press-supporting force of the pelvic part supporting cushioning member 152 shown in FIG. 4 is increased. It is found that by a combined effects of the above, in the resonance point, a resonance point passing phenomenon in which a reverse phase is generated in response to the vibration input in the vertical direction to decrease the gain, and the vibration absorption characteristic is improved by a uniform motion of the human body and the cushioning member. Further, if a conventional urethane member or another spring structure is adopted for the seat back section, a sky-hook effect using a colliding vibration, that is, by force, occurs and the vibration characteristic around the resonance point is improved.

In order to increase a braking capability of the first link plates 113, 113 and the second link plates 116, 116 at the top dead center and the bottom dead center, it is preferable that the top and the bottom dead centers are provided with stoppers such as rubber members, and by constituting in a manner that any portion of the parallel link mechanism or of the frame member supported by the parallel link mechanism makes contact with the stopper, a braking force in a reverse direction of a motion direction of the parallel link mechanism or the like works, so that the vibration absorption function can be further improved. For example, in the present embodiment, a weight detection width is set to be 20 mm, and in a range of this width, only the spring constant of the torsion bar 112 functions, and when exceeding this range of the width, a spring constant of the stopper of the rubber member or the like disposed at the top dead center or the bottom dead center is also applied.

Figure 8:
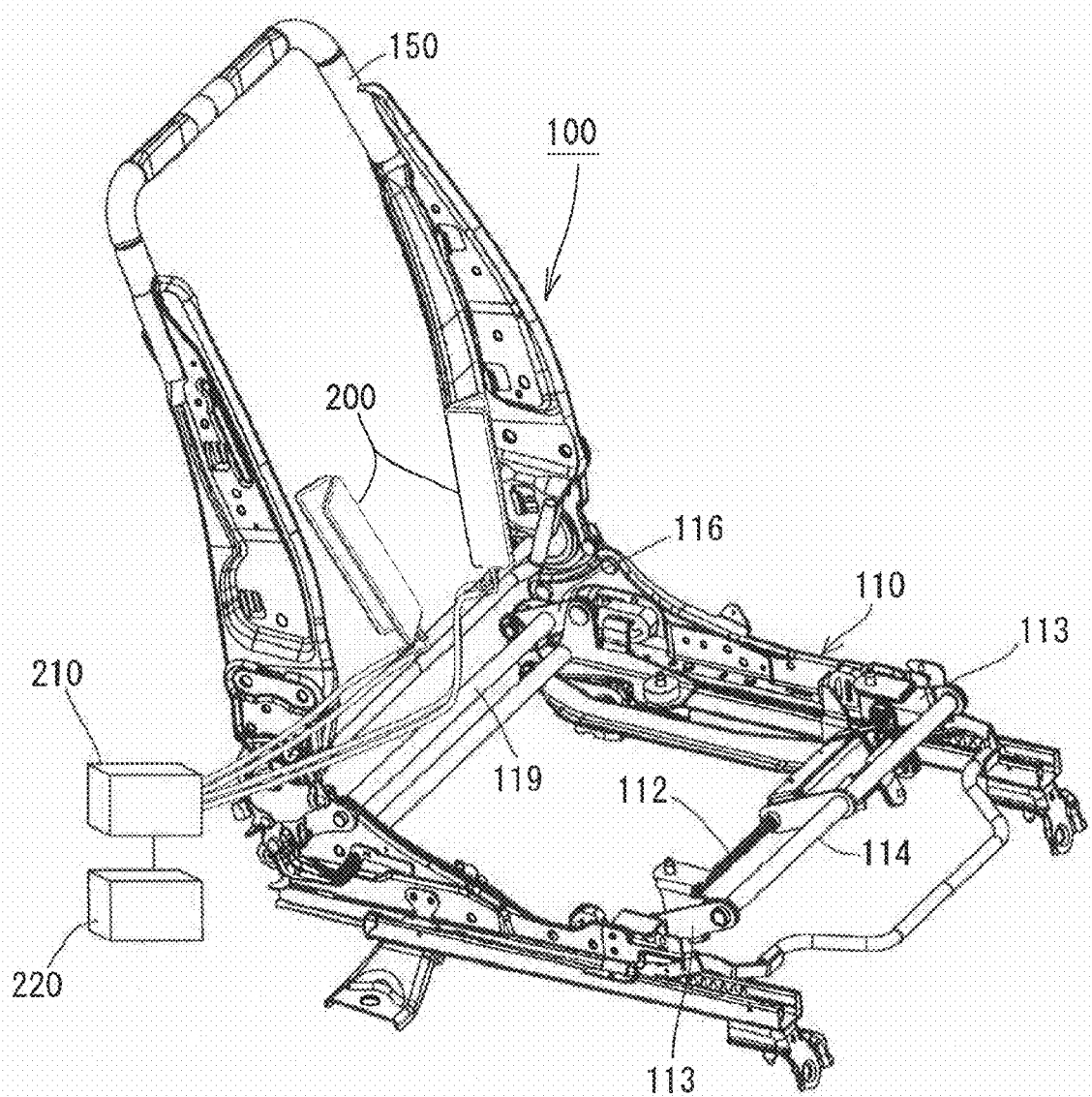
FIG. 8 is a view showing a schematic configuration of a seat in which a bio-signal detecting device is incorporated as a load information detecting means.

Here, FIG. 16 is a graph showing a relation between a frequency and a power spectrum of a pressure amplitude analyzed in a neighborhood (70 mm on the observer's right from a center line of the seat back section 150, 60 mm above a belt line of a test subject) corresponding to a disposition position of the pelvic part supporting cushioning member 152 at a time that the random vibrating of FIG. 15 is performed. In the case of the seat of the conventional structure, the external vibration input functions to hamper a respiratory movement, while in the present embodiment, as shown in FIG. 16, a supporting pressure to the lumbar vertebra is increased so that abdominal respiration can be done easily. In other words, in a static state, supporting to the lumbar vertebra is not strong, but when a vibration is inputted by driving, a human body is pressed in a direction of the seat back section 150 due to a motion of the parallel link mechanism. Since the pelvic part supporting cushioning member 152 shown in FIG. 4 is disposed in the lumbar vertebra part, pressing to the seat back section 150 by the parallel link mechanism increases the supporting pressure in a portion which has been missing in terms of continuity of a vertical section in correspondence with the input vibration, thereby eliminating a prominence in a surface pressure, and in addition, a motion of a thoracic vertebra is small and a fluctuation is generated in a lumbar part, so that a respiration motion is assisted. FIG. 16 shows the pressure of the above-described specific portion, while FIG. 17 (*a*) to FIG. 17 (*h*) are graphs showing body pressure distributions in a broader range of the seat back section 150 for frequencies from 3 Hz to 10 Hz. In FIG. 8 (*a*) to FIG. 8 (*h*), there are shown, for comparison, body pressure distributions in a seat back section also for frequencies from 3 Hz to 10 Hz when the same experiment is performed while being seated in the seat of the conventional structure. When FIG. 17 (*a*) to FIG. 17 (*h*) and FIG. 18 (*a*) to FIG. 18 (*h*) are compared, it is found in the seat of the present embodiment shown in FIG. 17, for any frequency of the inputted external vibration, a pressure of an upper peripheral edge of the pelvis rises, the seat supporting the upper peripheral edge of the pelvis, and the pressure in the portion which has been missing in terms of continuity of the vertical section rises. Especially in the data of 7 Hz to 10 Hz, a pressure of the breast part is small and pressure fluctuations occur intensively in the pelvis, a motion of the pelvis not being prevented, so that the respiratory motion is promoted. In contrast, in the seat of the conventional structure of FIG. 18, a pressure of the neighborhood of the upper peripheral edge of the pelvis is low, the seat not supporting the upper peripheral edge of the pelvis. In consequence, in the seat of the present embodiment, due to a respiratory motion promoting function as above, a fatigue accumulation degree is decreased compared with the seat of the conventional structure as shown in FIG. 19. Further, the fact that the supporting pressure of the lumbar vertebra is increased in correspondence with the input vibration means that if an air cushion 200 shown in FIG. 8 to be disposed in a position corresponding to the lumbar vertebra part is disposed, closeness of contact between the air cushion 200 and the human body is enhanced and the pressure fluctuation of the breast part becomes small, so that bio-signal detection sensitivity is also improved.

Further, there is obtained a fatigue degree at a time that the above-described test subject is seated in the seat 100 of the present embodiment and the seat of the conventional structure for 30 minutes respectively and vibrations are applied using random waves similar to those of FIG. 15, by using a program for quantifying a fatigue degree which the present applicant discloses in WO 2005/039415. A result thereof is shown in FIG. 19. Further, time series waveforms of heart beats and respiration of the test subject of experiments in FIG. 14 to FIG. 19 in a static state as well as time series waveforms of heart beats and respiration of the test subject in a random vibration state (active state) of FIG. 15 are investigated and shown in FIG. 20 (*a*) and FIG. 20 (*b*). It should be noted that the time series waveforms of heart beats and respiration is investigated by using the bio-signal detecting device shown in FIG. 8 and details of this device will be described later.

Figure 20A:
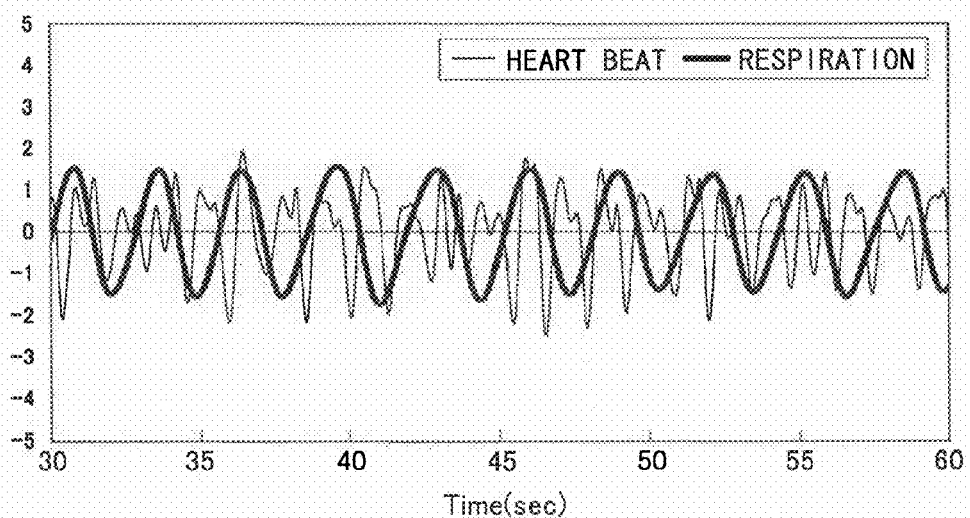
FIG. 20 (a) and FIG. 20 (b) are graphs showing time series waveforms of heart beats and respiration in a static state, and a time series waveform of heart beats and respiration in a random vibration state (dynamic state) of FIG. 15, of a test subject of tests of FIG. 14 to FIG. 19.
Figure 20B:
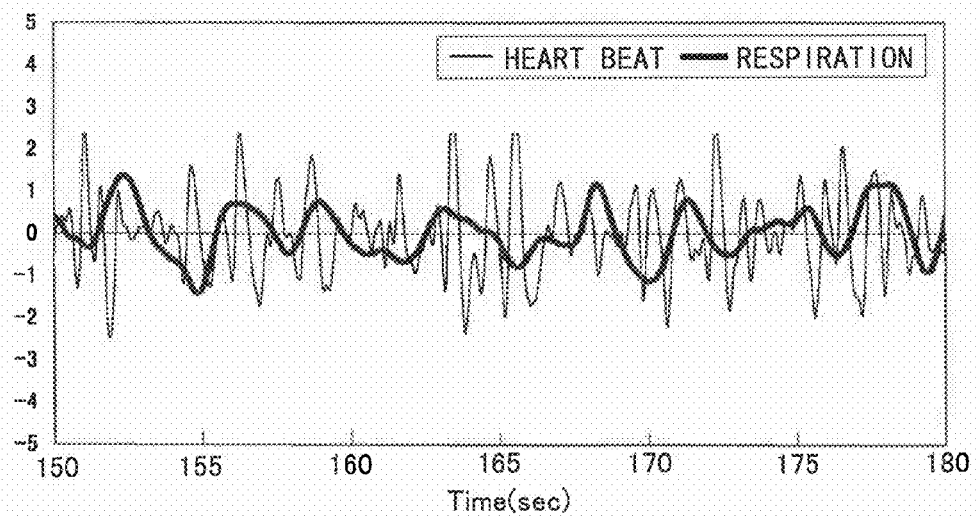

First, comparing the static state of FIG. 20 (*a*) with the active state of FIG. 20 (*b*), it is found that heart rates and respiratory rates of this test subject stay at almost the same level. In other words, it can be said that this test subject has a high resistance property against vibrations, but when referring to the fatigue rate of FIG. 19, after about 15 minutes passes since being seated, the fatigue rate in a case of being seated in the seat of the conventional structure is distinctly higher than in a case of being seated in the seat 100 of the present embodiment. Therefore, it is found that there is a distinctive difference in fatigue accumulation degrees between a case with the structure capable of decreasing vibrations of frequency bands in a neighborhood of 5 Hz and in a neighborhood of 8 Hz as in the case of the seat 100 of the present embodiment and a case without such a structure, even for a person having a high resistance property against vibrations.

It should be noted that the case of using the urethane member as the cushioning member to be used in the seat cushion section is exemplified in the above embodiment, but it is possible to adopt a cushioning member with a structure in which a three-dimensional knitted fabric, a two-dimensional net or the like is strained between a front edge portion supporting frame 114 and a rear edge portion supporting frame 119 provided between second link plates 116, 116.

Further, in the above-described embodiment, the load fluctuation detecting device 1 is incorporated in the seat 100 as a load information detecting means, but it is possible to configure to incorporate, as shown in FIG. 8, a bio-signal analyzing device which includes an air cushion 200 that is disposed, in a seat back section 150, in at least one of positions corresponding to right and left iliocostalis lumborum muscles of a person in a vertically long state along the iliocostalis lumborum muscle and that has a length enabling its top end to be set at a height equivalent to a lower surface of a diaphragm of a person, and an analyzing means 220 for detecting an air pressure fluctuation of the air cushion 200 generated by a bio-signal of the person via an air pressure measuring device 210 and for analyzing a biological state of the person. According to this bio-signal analyzing device, a heart beat, voice, and respiration are transmitted as solid borne sound to the air cushion 200 which is filled with air via the diaphragm and the iliocostalis lumborum muscle. Otherwise, the air cushion 200 is pressed by a motion of muscle accompanying respiration or the like. As a result, the air pressure of the air cushion 200 fluctuates, and by analyzing its time series waveform by means of the analyzing means 220, the biological state can be judged. On this occasion, according to the seat 100 of the present embodiment, since the seat back section 150 and the seat cushion section 110 properly follow a human motion due to the configuration described above, by supporting the air cushion 200 in a manner to move with the cushioning member of the seat cushion section 110, the air pressure fluctuation of the air cushion 200 by the bio-signal is sensitively performed. It should be noted that as a computer program for analysis set for the analyzing means 220, there can be used, for example, a program for judging a biological state such as hypnagogic symptoms, the program having been disclosed in WO 2005/092193 applied by the present applicant, or the program for quantifying a fatigue degree, the program having been disclosed in WO 2005/039415, and thereby, the hypnagogic symptoms, the fatigue degree and the like are judged.

The invention claimed is:

1. A seat comprising:
    a torsion bar disposed in one of a neighborhood of a front end and a neighborhood of a rear end of a seat cushion section along a width direction;
    a parallel link mechanism including a first link plate pivotally supported by said torsion bar, a second link plate pivotally supported by the other of the neighborhood of the front end and the neighborhood of the rear end of the seat cushion section, and a connection link plate connecting the first link plate and the second link plate, wherein operational directions of the first link plate and the second link plate are set to almost coincide with a vertical direction along a surface of a seat back section; and
    a cushioning member supported by said parallel link mechanism, wherein
    said torsion bar is configured so that a restoring force does not work at a neutral point where no load is applied to said torsion bar, and it is configured so that, when the first link plate and the second link plate operate from the neutral point of said torsion bar in a top dead center direction or a bottom dead center direction, said torsion bar is twisted in one direction or in a reverse direction, thereby making the restoring force to restore the first link plate and the second link plate in a neutral point direction work.

2. The seat according to claim 1,
    wherein as the first link plate constituting said parallel link mechanism, an almost L-shaped link plate whose bent portion is pivotally supported by said torsion bar, whose front end is positioned forward of said torsion bar, and whose rear end is positioned below said torsion bar is used,
    wherein as the second link plate, an almost L-shaped link plate whose bent portion is pivotally supported by the neighborhood of the rear end of the seat cushion section, whose front end is positioned forward of a pivotal support position of the bent portion, and whose rear end is positioned below the pivotal support position of the bent portion is used, and
    wherein the connection link plate is provided to connect rear ends of the first link plate and the second link plate.

3. The seat according to claim 1, wherein
    said cushioning member is disposed in the seat back section and is disposed to be movable vertically in accordance with an external vibration input.

4. The seat according to claim 1, wherein
    a displacement range of each end portion of the first link plate and the second link plate is in a range of 15 to 100 mm in the vertical direction and in a range of 5 to 50 mm in a forward and backward direction.

5. The seat according to claim 1, further comprising
    a load information detecting means incorporated in an arbitrary region.

6. The seat according to claim 5, wherein
    said load information detecting means is a bio-signal analyzing device which includes an air cushion that is disposed, in the seat back section, in at least one of positions corresponding to right and left iliocostalis lumborum muscles of a person in a vertically long state along the iliocostalis lumborum muscle and that has a length enabling its top end to be set at a height equivalent to a lower surface of a diaphragm of the person, and an analyzing means for analyzing a biological state of the person from an air pressure fluctuation of the air cushion generated by a bio-signal of the person.

7. The seat according to claim 5, wherein said load information detecting means is a load fluctuation detecting device mounted on said torsion bar.

8. The seat according to claim 7, wherein
    the load fluctuation detecting device includes a reference bar made of a magnetic substance which is not distorted by the load fluctuation, as well as includes an exciting coil wound around said torsion bar and the reference bar in a bundle, a first pick up coil wound around said torsion bar, a second pick up coil wound around the reference bar, and a difference outputting means outputting a difference of output values between the first pick up coil and the second pick up coil.

9. The seat according to claim 8, wherein
    the reference bar, the first pick up coil, the second pick up coil and the exciting coil of the load fluctuation detecting device are housed in a housing made of a magnetic substance.

10. The seat according to claim 9, wherein
    the reference bar of the load fluctuation detecting device is molded with a synthetic resin and is housed in the housing.

11. A seat comprising:
    a torsion bar disposed in one of a neighborhood of a front end and a neighborhood of a rear end of a seat cushion section along a width direction;

a parallel link mechanism including a first link plate pivotally supported by said torsion bar, a second link plate pivotally supported by the other of the neighborhood of the front end and the neighborhood of the rear end of the seat cushion section, and a connection link plate connecting the first link plate and the second link plate, wherein operational directions of the first link plate and the second link plate are set to almost coincide with a vertical direction along a surface of a seat back section;

a cushioning member supported by said parallel link mechanism; and a load information detecting means incorporated in an arbitrary region, wherein said load information detecting means is a bio-signal analyzing device which includes an air cushion that is disposed, in the seat back section, in at least one of positions corresponding to right and left iliocostalis lumborum muscles of a person in a vertically long state along the iliocostalis lumborum muscle and that has a length enabling its top end to be set at a height equivalent to a lower surface of a diaphragm of the person, and an analyzing means for analyzing a biological state of the person from an air pressure fluctuation of the air cushion generated by a bio-signal of the person.

12. A seat comprising:

a torsion bar disposed in one of a neighborhood of a front end and a neighborhood of a rear end of a seat cushion section along a width direction;

a parallel link mechanism including a first link plate pivotally supported by said torsion bar, a second link plate pivotally supported by the other of the neighborhood of the front end and the neighborhood of the rear end of the seat cushion section, and a connection link plate connecting the first link plate and the second link plate, wherein operational directions of the first link plate and the second link plate are set to almost coincide with a vertical direction along a surface of a seat back section;

a cushioning member supported by said parallel link mechanism; and a load information detecting means incorporated in an arbitrary region, wherein said load information detecting means is a load fluctuation detecting device mounted on said torsion bar.

13. The seat according to claim 12, wherein the load fluctuation detecting device includes a reference bar made of a magnetic substance which is not distorted by the load fluctuation, as well as includes an exciting coil wound around said torsion bar and the reference bar in a bundle, a first pick up coil wound around said torsion bar, a second pick up coil wound around the reference bar, and a difference outputting means outputting a difference of output values between the first pick up coil and the second pick up coil.

14. The seat according to claim 13, wherein the reference bar, the first pick up coil, the second pick up coil and the exciting coil of the load fluctuation detecting device are housed in a housing made of a magnetic substance.

15. The seat according to claim 14, wherein the reference bar of the load fluctuation detecting device is molded with a synthetic resin and is housed in the housing.

* * * * *